US012071343B2

(12) United States Patent
Jones et al.

(10) Patent No.: US 12,071,343 B2
(45) Date of Patent: Aug. 27, 2024

(54) ASSEMBLY OF PLANAR CHIRAL SUPERLATTICES FROM ACHIRAL BUILDING BLOCKS

(71) Applicant: WILLIAM MARSH RICE UNIVERSITY, Houston, TX (US)

(72) Inventors: Matthew R Jones, Houston, TX (US); Zhihua Cheng, Houston, TX (US); Yuchen Xing, Houston, TX (US)

(73) Assignee: William Marsh Rice University, Houston, TX (US)

(*) Notice: Subject to any disclaimer, the term of this patent is extended or adjusted under 35 U.S.C. 154(b) by 0 days.

(21) Appl. No.: 18/107,459

(22) Filed: Feb. 8, 2023

(65) Prior Publication Data

US 2023/0249966 A1      Aug. 10, 2023

Related U.S. Application Data

(60) Provisional application No. 63/307,790, filed on Feb. 8, 2022.

(51) Int. Cl.
| | |
|---|---|
| *B82B 3/00* | (2006.01) |
| *B22F 1/054* | (2022.01) |
| *B82Y 30/00* | (2011.01) |
| *B82Y 40/00* | (2011.01) |

(52) U.S. Cl.
CPC .......... *B82B 3/0066* (2013.01); *B22F 1/0553* (2022.01); *B22F 2301/255* (2013.01); *B22F 2304/054* (2013.01); *B82Y 30/00* (2013.01); *B82Y 40/00* (2013.01)

(58) Field of Classification Search
None
See application file for complete search history.

(56) References Cited

U.S. PATENT DOCUMENTS

2018/0169754 A1\*  6/2018  Rosi ..................... B22F 1/0553
2022/0395901 A1\*  12/2022  Lee ........................... B22F 1/00

FOREIGN PATENT DOCUMENTS

WO    WO-2021096153 A1 \*  5/2021  ............ B22F 1/0044

OTHER PUBLICATIONS

Canfiled et al., "Chirality arising from small defects in gold nanoparticle arrays", 2006, Optics Express, vol. 14, pp. 950-955 (Year: 2006).\*
Volkov et al., "Optical activity in diffraction from a planar array of achiral nanoparticles", 2009, Physical Review A, vol. 79, pp. 043819-1-043819-5 (Year: 2009).\*

(Continued)

*Primary Examiner* — Seth Dumbris
(74) *Attorney, Agent, or Firm* — 24IP Law Group USA, PLLC; Timothy R. DeWitt

(57) ABSTRACT

The spontaneous assembly of chiral structures from building blocks that lack chirality is fundamentally important for colloidal chemistry and has implications for the formation of advanced optical materials. Here, we find that purified achiral gold tetrahedron-shaped nanoparticles assemble into two-dimensional superlattices that exhibit planar chirality under a balance of repulsive electrostatic and attractive van der Waals and depletion forces. A model accounting for these interactions shows that the growth of planar structures is kinetically preferred over similar three-dimensional products, explaining their selective formation.

8 Claims, 22 Drawing Sheets

(56) References Cited

OTHER PUBLICATIONS

Yang et al., "Chiral Metal Nanoparticle Superlattice Enabled by Porphyrin-Based Supramolecular Structures", 2021, Angew. Chem. Int. Ed., vol. 60, pp. 14671-14678 (Year: 2021).*
Nakagawa, Y., Kageyama, H., Oaki, Y. & Imai, H. Direction control of oriented self-assembly for 1D, 2D, and 3D microarrays of anisotropic rectangular nanoblocks. J. Am. Chem. Soc. 136, 3716-3719 (2014).
Fendler, J. H. Chemical self-assembly for electronic applications. Chem. Mater. 13, 3196-3210 (2001).
Dong, A., Chen, J., Vora, P. M., Kikkawa, J. M. & Murray, C. B. Binary nanocrystal superlattice membranes self-assembled at the liquid-air interface. Nature 466, 474-477 (2010).
Ye, X. et al. Competition of shape and interaction patchiness for self-assembling nanoplates. Nat. Chem. 5, 466-473 (2013).
O'Brien, M. N., Jones, M. R., Kohlstedt, K. L., Schatz, G. C. & Mirkin, C. A. Uniform circular disks with synthetically tailorable diameters: two-dimensional nanoparticles for plasmonics. Nano Lett. 15, 1012-1017 (2015).
Jones, M. R. et al. Deterministic symmetry breaking of plasmonic nanostructures enabled by DNA-programmable assembly. Nano Lett. 17,5830-5835 (2017).
O'Brien, M. N., Jones, M. R., Brown, K. A. & Mirkin, C. A. Universal noble metal nanoparticle seeds realized through iterative reductive growth and oxidative dissolution reactions. J. Am. Chem. Soc. 136, 7603-7606 (2014).
Bhattarai, A. et al. Tip-enhanced Raman nanospectroscopy of smooth spherical gold nanoparticles. Phys. Chem. Lett. 11, 1795-1801 (2020).
Wang, C.-F. et al. Tip-enhanced multipolar Raman scattering. Phys. Chem. Lett. 11, 2464-2469 (2020).
Gantapara, A. P., Qi, W. & Dijkstra, M. A novel chiral phase of achiral hard triangles and an entropy-driven demixing of enantiomers. Soft Matter 11, 8684-8691 (2015).
Leite, F. L., Bueno, C. C., Da Roz, A. L., Ziemath, E. C. & Oliveira, O. N. Theoretical models for surface forces and adhesion and their measurement using atomic force microscopy. Int. J. Mol. Sci. 13, 12773-12856 (2012).
Hunter, R. J. Foundation of colloid science (Oxford Univ. Press, New York, 594-598, 2001).
Walker, D. A., Browne, K. P., Kowalczyk, B. & Grzybowski, B. A. Selfassembly of nanotriangle superlattices facilitated by repulsive electrostatic interactions. Angew. Chem. Int Ed. 49, 6760-6763 (2010).
Alkilany, A. M., Frey, R. L., Ferry, J. L. & Murphy, C. J. Gold nanorods as nanoadmicelles: 1-Naphthol partitioning into a nanorod-bound surfactant bilayer. Langmuir 24, 10235-10239 (2008).
Asakawa, T., Kitano, H., Ohta, A. & Miyagishi, S. Convenient estimation for counterion dissociation of cationic micelles using chloride-sensitive fluorescence probe. J. Colloid Interface Sci. 242, 284-287 (2001).
Aswal, V. K. & Goyal, P. S. Role of different counterions and size of micelle in concentration dependence micellar structure of ionic surfactants. Chem. Phys. Lett. 368, 59-65 (2003).
Young, K. L. et al. Assembly of reconfigurable one-dimensional colloidal superlattices due to a synergy of fundamental nanoscale forces. Proc. Natl Acad. Sci. USA 129, 220-2245 (2012).
Shah, S. K. & Bhattarai, A. Interfacial and micellization behavior of cetyltrimethylammonium bromide (CTAB) in water and methanol-water mixture at 298.15 to 323.15 K. J. Chem. 2020, 4653092 (2020).
Carnahan, N. F. & Starling, K. E. Equation of state for nonattracting rigid spheres. J. Chem. Phys. 51, 635-636 (1969).
Rehn, S. M. et al. Mechanical reshaping of inorganic nanostructures with weak nanoscale forces. Nano Lett. 21, 130-135 (2021).
Van Damme, R.; et al. Classifying crystals of rounded tetrahedra and determining their order parameters using dimensionality reduction. ACS Nano 14, 15144-15153 (2020).
Cecconello, A., Besteiro, L. V., Govorov, A. O. & Willner, I. Chiroplasmonic DNA-based nanostructures. Nat. Rev. Mater. 2, 1703.
Mastroianni, A. J., Claridge, S. A. & Alivisatos, A. P. Pyramidal and chiral groupings of gold nanocrystals assembled using DNA scaffolds. J. Am. Chem.Soc. 131, 8455-8459 (2009).
Yashima, E. et al. Supramolecular helical systems: helical assemblies of smallmolecules, foldamers, and polymers with chiral amplification and their functions. Chem. Rev. 116, 13752-13990 (2016).
Hentschel, M., Schaferling, M., Duan, X., Giessen, H. & Liu, N. Chiral plasmonics. Sci. Adv. 3, e1602735 (2017).
Kuzyk, A. et al. Reconfigurable 3D plasmonic metamolecules. Nat. Mater. 13, 862-866 (2014).
Zhou, C., Duan, X. & Liu, N. A plasmonic nanorod that walks on DNA origami. Nat. Commun. 6, 8102 (2015).
Mammana, A., D'Urso, A., Lauceri, R. & Purrello, R. Switching off and on the supramolecular chiral memory in porphyrin assemblies. J. Am. Chem. Soc. 129, 8062-8063 (2007).
Nagaoka, Y. et al. Superstructures generated from truncated tetrahedral quantum dots. Nature 561, 378-382 (2018).
Zerrouki, D., Baudry, J., Pine, D., Chaikin, P. & Bibette, J. Chiral colloidal, clusters. Nature 455, 380-382 (2008).
Chen, Q. et al. Supracolloidal reaction kinetics of Janus spheres. Science 331, 199-202 (2011).
Singh, G. et al. Self-assembly of magnetite nanocubes into helical superstructures. Science 345, 1149-1153 (2014).
Pendry, J. B. A chiral route to negative refraction. Science 306, 1353-1355 (2004).
Soukoulis, C. M. & Wegener, M. Past achievements and future challenges in the development of three-dimensional photonic metamaterials. Nat. Photonics 5, 523-530 (2011).
Agarwal, A., Lilly, G. D., Govorov, A. O. & Kotov, N. A. Optical emission and energy transfer in nanoparticle-nanorod assemblies: potential energy pump system for negative refractive index materials. J. Phys. Chem. C. 112, 18314-18320 (2008).
Smith, K. W. et al. Exploiting evanescent field polarization for giant chiroptical modulation from achiral gold half-rings. ACS Nano 12, 11657-11663 (2018).
Hendry, E. et al. Ultrasensitive detection and characterization of biomolecules using superchiral fields. Nat. Nanotech. 5, 783-787 (2010).
Papakostas, A. et al. Optical manifestations of planar chirality. Phys. Rev. Lett. 90, 107404 (2003).
Li, Z., Gokkavas, M. & Ozbay, E. Manipulation of asymmetric transmission in planar chiral nanostructures by anisotropic loss. Adv. Opt. Mater. 1, 482-488 (2013).
Schnell, M. et al. Real-space mapping of the chiral near-field distributions in spiral antennas and planar metasurfaces. Nano Lett. 16, 663-670 (2016).
Ogier, R., Fang, Y., Svedendahl, M., Johansson, P. & Kall, M. Macroscopic layers of chiral plasmonic nanoparticle oligomers from colloidal lithography. ACS Photonics 1, 1074-1081 (2014).
Damasceno, P. F., Engel, M. & Glotzer, S. C. Crystalline assemblies and densest packings of a family of truncated tetrahedra and the role of directional entropic forces. ACS Nano 6, 609-614 (2012).
Van Anders, G., Klotsa, D., Ahmed, N. K., Engel, M. & Glotzer, S. C. Understanding shape entropy through local dense packing. Proc. Natl Acad. Sci. USA 111, 4812-4821 (2014).
Chen, E. R., Engel, M. & Glotzer, S. C. Dense crystalline dimer packings of regular tetrahedra. Discret. Comput. Geom. 44, 253-280 (2010).
Haji-Akbari, A. et al. Disordered, quasicrystalline and crystalline phases of densely packed tetrahedra. Nature 462, 773-777 (2009).
Conway, J. H. & Torquato, S. Packing, tiling, and covering with tetrahedra. Proc. Natl Acad. Sci. USA 103, 10612-10617 (2006).
Lee, H.-E. et al. Amino-acid- and peptide-directed synthesis of chiral plasmonic gold nanoparticles. Nature 556, 360-365 (2018).
Im, S. W. et al. Chiral surface and geometry of metal nanocrystals. Adv. Mater. 32, 1905758 (2020).
Kim, H. et al. γ-Glutamylcysteine- and cysteinylglycine-directed growth of chiral gold nanoparticles and their crystallographic analysis. Angew. Chem. Int. Ed. 59, 12976-12983 (2020).
Jiang, W. et al. Emergence of complexity in hierarchically organized chiral particles. Science 368, 642-648 (2020).

(56) References Cited

OTHER PUBLICATIONS

Walker, D. A., Leitsch, E. K., Nap, R. J., Szleifer, I. & Grzybowski, B. A. Geometric curvature controls the chemical patchiness and self-assembly of nanoparticles. Nat. Nanotech. 8, 676-681 (2013).

Smith, K. W. et al. Chiral and achiral nanodumbbell dimers: the effect of geometry on plasmonic properties. ACS Nano 10, 6180 (2016).

Nagaoka, Y., Zhu, H., Eggert, D. & Chen, O. Single-component quasicrystalline nanocrystal superlattices through flexible polygon tiling rule. Science 362, 1396-1400 (2018).

Boles, M. A. & Talapin, D. V. Self-assembly of tetrahedral CdSe nanocrystals: Effective "patchiness" via anisotropic steric interaction. J. Am. Chem. Soc. 136, 5868-5871 (2014).

Sun, M., Cheng, Z., Chen, W. & Jones, M. R. Understanding symmetry breaking at the single-particle level via the growth of tetrahedron-shaped nanocrystals from higher-symmetry precursors. ACS Nano 15, 15953-15961 (2021).

Zheng, Y. et al. Seed-mediated synthesis of gold tetrahedra in high purity and with tunable, well-controlled sizes. Chem. Asian J. 9, 2635-2640 (2014).

Kim, F., Connor, S., Song, H., Kuykendall, T. & Yang, P. Platonic gold nanocrystals. Angew. Chem. Int. Ed. 43, 3673-3677 (2004).

Israelachvili, J. N. Intermolecular and surface forces, 3rd edition. (Academic Press, Cambridge, MA, 2011).

Pashley, R. M., McGuiggan, P. M., Horn, R. G. & Ninham, B. W. Forces between bilayers of cetyltrimethylammonium bromide in micellar solutions. J. Colloid Interface Sci. 126, 569-578 (1988).

Bishop, K. J. M., Wilmer, C. E., Soh, S. & Grzybowski, B. A. Nanoscale forces and their uses in self-assembly. Small 5, 1600-1630 (2009).

Iracki, T. D., Beltran-Villegas, D. J., Eichmann, S. L. & Bevan, M. A. Charged micelle depletion attraction and interfacial colloidal phase behavior. Langmuir 26, 18710-18717 (2010).

Hueckel, T., Hocky, G. M., Palacci, J. & Sacanna, S. Ionic solids from common colloids. Nature 580, 487-490 (2020).

Henzie, J., Grunwald, M., Widmer-Cooper, A., Geissler, P. L. & Yang, P. Selfassembly of uniform polyhedral silver nanocrystals into densest packings and exotic superlattices. Nat. Mater. 11, 131-137 (2012).

Coropceanu, I. et al. Self-assembly of nanocrystals into strongly electronically coupled all-inorganic supercrystals. Science 375, 1422-1426 (2022).

Vutukuri, H. R., Badaire, S., Matthijs de Winter, D. A., Imhof, A. & van Blaaderen, A. Directed self-assembly of micron-sized gold nanoplatelets into oriented flexible stacks with tunable interplate distance. Nano Lett. 15, 5617-5623 (2015).

Zhao, K. & Mason, T. G. Directing colloidal self-assembly through roughnesscontrolled depletion attractions. Phys. Rev. Lett. 99, 268301 (2007).

Young, K. L. et al. Assembly of reconfigurable one-dimensional colloidal superlattices due to a synergy of fundamental nanoscale forces. Proc. Natl Acad. Sci. USA 109, 2240-2245 (2012).

Rouhollahi, A., Fazlolahzadeh, O., Dolati, A. & Ghahramanifard, F. Effects of different surfactants on the silica content and characterization of Ni—SiO2 nanocomposites. J. Nanostruct. Chem. 8, 139-152 (2018).

* cited by examiner

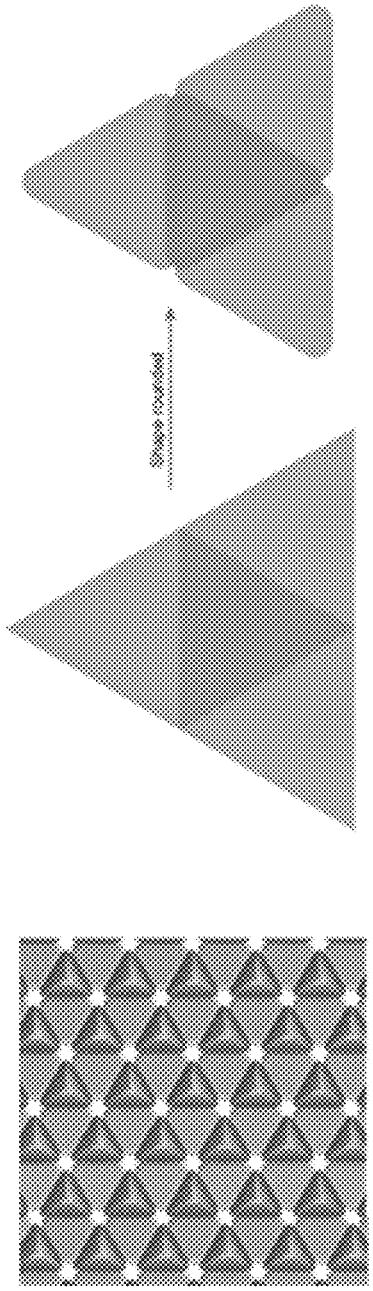
FIG. 14A
FIG. 14B
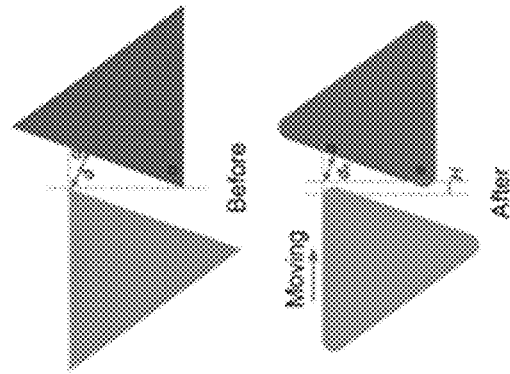
FIG. 14D
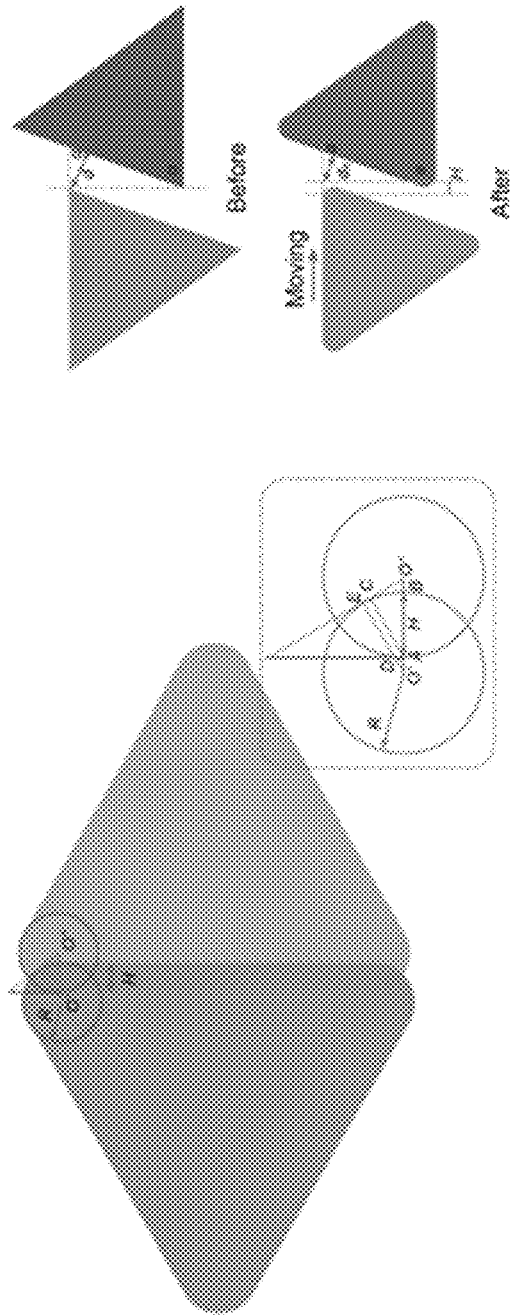
FIG. 14C

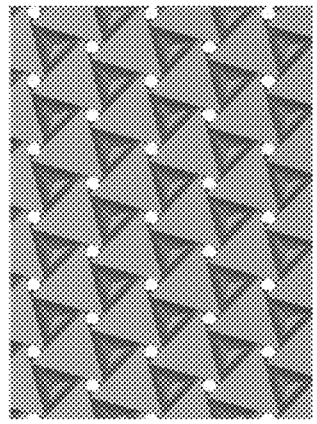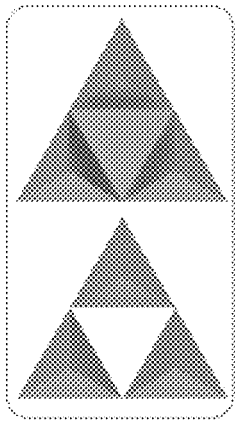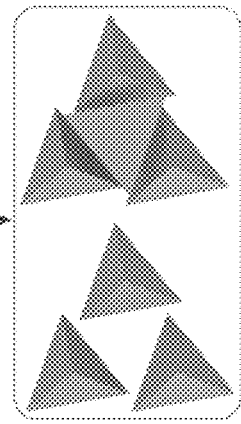
FIG. 15A
FIG. 15B
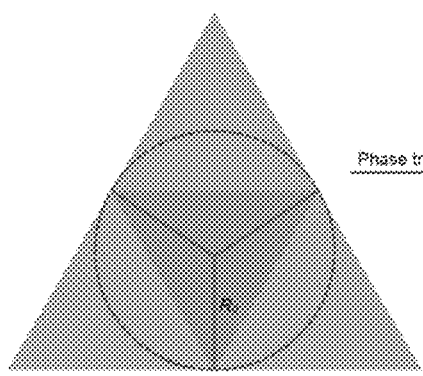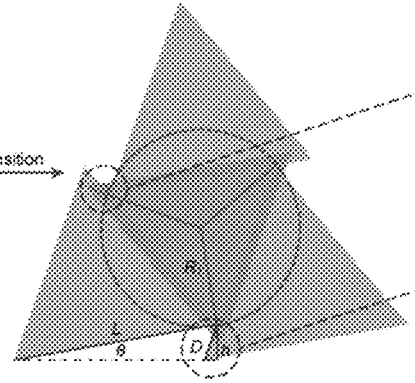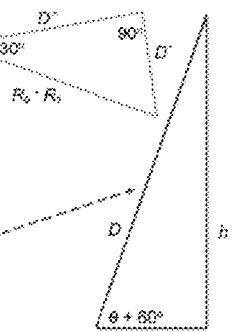
FIG. 15C
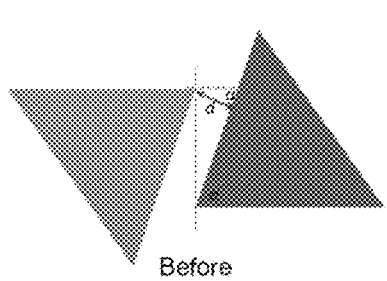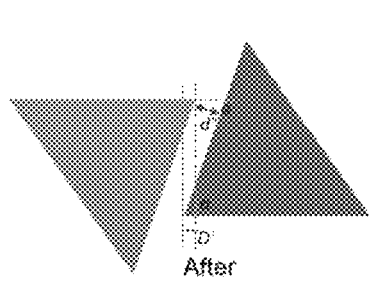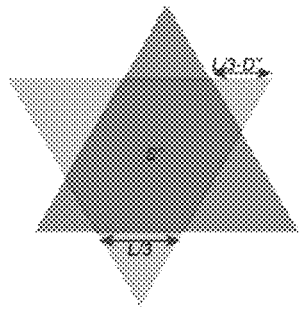
FIG. 15D Table 2
Dataset of size measurements of Au Td NPs after separation (edge length: nm)

| | | | | | | | | | |
|---|---|---|---|---|---|---|---|---|---|
| 63.59 | 63.55 | 63.53 | 63.69 | 63.61 | 64.42 | 64.24 | 64.17 | 64.51 | 64.25 |
| 63.64 | 62.61 | 64.41 | 64.69 | 65.11 | 64.54 | 64.29 | 64.46 | 65.42 | 64.32 |
| 63.65 | 63.29 | 65.29 | 65.4 | 65.13 | 65.35 | 65.28 | 65.46 | 65.44 | 65.23 |
| 65.21 | 63.42 | 65.29 | 65.5 | 65.13 | 65.41 | 65.4 | 65.55 | 65.64 | 66.12 |
| 65.23 | 63.57 | 65.35 | 66.12 | 66.16 | 66.13 | 66.23 | 66.13 | 66.22 | 66.16 |
| 66.04 | 63.68 | 65.37 | 66.15 | 66.19 | 66.15 | 66.23 | 66.22 | 66.23 | 66.16 |
| 66.23 | 64.27 | 65.41 | 66.22 | 66.23 | 66.23 | 66.24 | 66.23 | 66.24 | 66.19 |
| 66.23 | 64.32 | 66.15 | 66.25 | 66.23 | 66.26 | 66.28 | 66.25 | 66.25 | 66.21 |
| 66.29 | 64.35 | 66.24 | 66.26 | 66.24 | 66.32 | 66.3 | 66.25 | 66.28 | 66.23 |
| 66.35 | 65.26 | 66.26 | 66.26 | 66.24 | 66.32 | 66.31 | 66.26 | 66.28 | 66.23 |
| 66.49 | 65.44 | 66.26 | 66.29 | 66.26 | 66.39 | 66.33 | 66.26 | 65.29 | 66.24 |
| 66.64 | 66.26 | 66.26 | 66.3 | 66.26 | 66.44 | 66.35 | 66.26 | 66.29 | 66.26 |
| 67.24 | 66.26 | 66.26 | 66.35 | 66.26 | 66.48 | 66.35 | 66.26 | 66.31 | 66.26 |
| 67.37 | 66.3 | 66.33 | 66.37 | 66.26 | 66.48 | 66.35 | 66.27 | 66.31 | 66.27 |
| 67.54 | 66.32 | 66.35 | 66.38 | 66.26 | 66.56 | 66.37 | 66.31 | 66.35 | 66.28 |
| 67.15 | 66.33 | 66.36 | 66.39 | 66.26 | 66.56 | 66.38 | 66.32 | 66.35 | 66.28 |
| 68.18 | 66.38 | 66.38 | 66.49 | 66.28 | 66.58 | 66.38 | 66.35 | 66.38 | 66.29 |
| 68.3 | 66.43 | 66.4 | 66.52 | 66.28 | 66.59 | 66.38 | 66.35 | 66.42 | 66.31 |
| 68.48 | 67.12 | 66.45 | 66.53 | 66.29 | 66.62 | 66.42 | 66.35 | 66.47 | 66.32 |
| 68.5 | 67.44 | 66.51 | 66.55 | 66.3 | 66.63 | 66.43 | 66.43 | 66.56 | 66.33 |
| 68.53 | 67.23 | 67.26 | 66.56 | 66.31 | 66.68 | 66.47 | 66.64 | 66.57 | 66.35 |
| 68.65 | 68.42 | 67.51 | 66.58 | 66.51 | 67.24 | 66.54 | 66.67 | 67.29 | 66.35 |
| 68.65 | 68.43 | 68.22 | 67.17 | 67.32 | 67.51 | 67.46 | 67.41 | 68.21 | 67.41 |
| 68.67 | 68.62 | 68.38 | 68.24 | 67.35 | 68.25 | 67.51 | 68.36 | 68.4 | 68.22 |
| 68.68 | 69.02 | 68.61 | 68.71 | 68.13 | 68.62 | 67.51 | 67.81 | 68.51 | 68.24 |

| Average | 66.3039 | Standard deviation | 1.14 | Coefficient of variation | 1.72% |
|---|---|---|---|---|---|

FIG. 20

ASSEMBLY OF PLANAR CHIRAL SUPERLATTICES FROM ACHIRAL BUILDING BLOCKS

CROSS-REFERENCE TO RELATED APPLICATIONS

The present application claims the benefit of the filing date of U.S. Provisional Patent Application Ser. No. 63/307,790 filed by the present inventors on Feb. 8, 2022.

The aforementioned provisional patent application is hereby incorporated by reference in its entirety.

BACKGROUND OF THE INVENTION

Field of the Invention

The present invention relates to formation of chiral hexagonal superlattices.

Brief Description of the Related Art

The tendency for matter to exhibit configurations with chiral symmetry has ramifications for a diverse set of scientific disciplines ranging from particle physics to the origin of life. For most chemical systems, chiral symmetry emerges at a given length scale only if at a smaller length scale there exists a chiral center that "seeds" growth. More recently, micron- and nanometer-scale colloids that are achiral have demonstrated the ability to spontaneously assemble into ordered chiral superlattices. However, these exclusively form linear helix or twisted ribbon architectures. Particularly for nanophotonics applications, in which chiral configurations have been intensely pursued as a route to metamaterials with negative refractive index, the formation of planar 2D chiral assemblies would be advantageous in the improved structural control and increased scale compared to laborious lithographic techniques that are more commonly employed.

The packing of tetrahedra (Td) represents a rich field constituting mathematical theory, molecular dynamics simulations, and experimental colloidal chemistry. A complex phase space has been mapped in which numerous symmetric arrangements form depending on the degree of tip truncation, rounding of tips/edges, and the fundamental interparticle interactions driving assembly. Mathematically, the densest packing of Td is the so-called dimer crystal (DC) with a density of ~85.63%[22], but lattices constituting hexagonal, body centered cubic, diamond cubic, triclinic, icosahedral, decahedral, and quasicrystalline order have been simulated; the only proposed structure with chiral symmetry reported thus far is a linear helix. van Damme, R.; et al. Classifying crystals of rounded tetrahedra and determining their order parameters using dimensionality reduction. *ACS Nano* 14, 15144-15153 (2020).

Assembly or synthesis of chiral nanomaterials is generally accomplished through the introduction of chiral surface ligands that control the growth of helicoid facets or favor interactions between particles of like-handedness. Formation of chiral superlattices from achiral building blocks is more unusual and requires a balance of attractive and repulsive forces. For example, nanoparticles with conflicting van der Waals and dipole interactions or dumbbell nanorods with attractive centers and repulsive ends have been shown to form helix or twisted ribbon morphologies. Numerous reports have investigated the assembly of Td-shaped semiconductor nanocrystals, confirming several of the mathematically-proposed structures. Both chiral helix and twisted ribbon structures have been observed to assemble from achiral tetrahedra. However, the assembly of plasmonic Td particles and the ability for Td to form 2D chiral superlattices have yet to be examined. This invention was funded in part by the Robert A. Welch Foundation under Welch Grant No. C-1954.

SUMMARY OF THE INVENTION

In this work, we demonstrate the formation of chiral hexagonal superlattices that are one unit cell in thickness, assembled from achiral Td building blocks. This is enabled by a purification strategy that allows for particle samples with sharp tips in >95% shape yield with <2% size variation. Although in three dimensions these materials are not intrinsically chiral, we observe that they grow from and are confined to substrates, preventing their free rotation and resulting in what is known as "planar chirality." Furthermore, we find that lateral growth processes in these superlattices are kinetically-enhanced compared to mechanisms that result in out-of-plane growth, preserving their planarity and preventing the formation of a 3D crystal. The nanoparticle-based superlattices adopt equal number of both chiral enantiomers but generate domains that are large enough (>1-2 um) such that a single handedness can be measured and manipulated. Comparison of the energetic stability of several related 2D packings of Td allows for a proposed formation mechanism in which sharp-tipped particles are required for the chiral phase to nucleate from within the achiral phase over the course of the assembly process. These findings lay the fundamental groundwork for the scalable formation of chiral plasmonic planar metamaterials.

In a preferred embodiment, the present invention is a new composition of matter. Spontaneous assembly of chiral structures from building blocks that lack chirality is fundamentally important for colloidal chemistry and has implications for the formation of advanced optical materials. Here, we find that purified achiral gold tetrahedron-shaped nanoparticles assemble into two-dimensional superlattices that exhibit planar chirality under a balance of repulsive electrostatic and attractive van der Waals and depletion forces. A model accounting for these interactions shows that the growth of planar structures is kinetically preferred over similar three-dimensional products, explaining their selective formation. Exploration and mapping of different packing symmetries demonstrates that the hexagonal chiral phase forms exclusively because of geometric constraints imposed by the presence of constituent tetrahedra with sharp tips. A formation mechanism is proposed in which the chiral phase nucleates from within a related 2D achiral phase by clockwise or counterclockwise rotation of tetrahedra about their central axis. These results lay the scientific foundation for the high-throughput assembly of planar chiral metamaterials.

Still other aspects, features, and advantages of the present invention are readily apparent from the following detailed description, simply by illustrating a preferable embodiments and implementations. The present invention is also capable of other and different embodiments and its several details can be modified in various obvious respects, all without departing from the spirit and scope of the present invention. Accordingly, the drawings and descriptions are to be regarded as illustrative in nature and not as restrictive. Additional objects and advantages of the invention will be set forth in part in the description which follows and in part will be obvious from the description or may be learned by practice of the invention.

BRIEF DESCRIPTION OF THE DRAWINGS

For a more complete understanding of the present invention and the advantages thereof, reference is now made to the following description and the accompanying drawings, in which:

FIG. 10A is a schematic illustration of the lattice, hexagonal repeat unit, and particle-particle overlap geometry for: a) achiral (1) 1010, b) achiral (2) 1020, and c) chiral (3) 1030 structures described in the text. FIG. 10B is a comparison of different superlattice energies as a function of CTAC concentration showing the ultimate stability of the chiral hexagonal (3) phase. FIG. 10C is an illustration of the rounding of tips and edges as a result of selective oxidation of Td particles. FIG. 10D is SEM images of the solvent evaporation-based assembly of Td particles with different tip radii, indicated in yellow. FIG. 10E is a concentration-dependent phase diagram generated from interaction potential model showing regions of stability of achiral (1) and chiral (3) structures as a function of Td tip radius. Lines indicate critical tip radius defining the phase-boundary calculated from the model (Rcal=7 nm) and determined experimentally (Rexp=8.4 nm). FIG. 10F is a phase diagram predicting the stability of achiral (1) or chiral (3) structures at the endpoint of the assembly process based on particle size and tip radius; blue line is calculated phase boundary while red and purple dots indicate experimental observation of the achiral or chiral structures, respectively. All scale bars are 100 nm.

In FIG. 11A a Tetrahedra (Td) packed into the achiral (1110) structure may (1120) undergo clockwise (CW) or counterclockwise (CCW) rotation to generate chiral enantiomers that (1130) can form a denser lattice with more favorable interparticle attractions. Definition of structural parameters for chiral superlattices (1140) including L, the Td edge length, D, the tip offset, and 0, the particle rotation angle. FIG. 11B shows model calculations comparing the interaction potential ($U_{tot}*$) as a function of rotation angle. Minimums in the plots define the optimal rotation angle ($\theta*$) which shift to higher values with increasing hexdecyltrimethylammonium chloride (CTAC) concentration. FIG. 11C shows optimal rotation angle for L=66.3 nm edge length Td at different CTAC concentrations showing the predicted value at the endpoint of the assembly process of 0 endpoint=20°. FIG. 11D shows calculated optimal rotation angles ($\theta*$) of chiral hexagonal assemblies for Td of varying edge length. Scale bar is 100 nm.

FIG. 12A shows an extended lattice of achiral (1) assemblies. FIG. 12B shows a model coordinate system used to calculate the contact area and interparticle distances. FIG. 12C shows a projection of two tetrahedra NPs along their [111] axis. FIG. 12D shows an overlap area S of two Td {111} planes. FIG. 12E shows interparticle distance between two tetrahedra NPs.

FIG. 13A shows an Extended lattice of achiral (2) assemblies, arrow indicates the top layer translation direction; FIG. 13B is a side view showing the change in NN distance (LId) can treated as the projection of movement along the normal of the tetrahedron plane; FIG. 13C is a projection showing the two types of interparticle distance. One is reduced ($d*$) and the other is increased (d') relative to achiral (1); FIG. 13D is a top view of the assembly with parameters used to calculate the contact area and NNN distance; the small red triangle is enlarged in FIG. 13E; FIG. 13E is an illustration of the relationship between the movement vectors (M, M', and M"); FIG. 13F illustrates two types of particle-particle contact area, (S) corresponding to NN ($d*$) facets and (S') corresponding to NNN facets (d').

FIGS. 14A-14D are schematic illustration and geometric models for rounded tetrahedra assemblies. FIG. 14A shows an extended lattice of achiral (1) assemblies of rounded Td, FIG. 14B shows an increased radius of curvature in rounded Td results in decreased minimum interparticle distance, allowing for more dense packing. FIG. 14C is a top view of two rounded Tds with detailed geometrical relationships as inset. FIG. 14D is a side view of two Td NPs before and after tip rounding with decreased $d^R$.

FIGS. 15A-15D are schematic illustrations and geometric models for rotation phase transformation. FIG. 15A shows an extended lattice of chiral (3) assemblies; FIG. 15B shows phase transformation for tetrahedra assemblies from achiral (1) to chiral (3) via Td rotation and lattice contraction; bottom images omit the central Td particle for clarity. FIG. 15C shows on the left a top view and geometric models of lattices before and after rotation; the small green and blue triangles are enlarged at the right. Geometric relationships between offset vectors D, D', and D". FIG. 15D shows (left) interparticle distance between Td in achiral (1) structure, where a and d represent the dihedral angle and the interparticle distance, respectively; (center) interparticle distance between Td in chiral (3) structure, where D' is the in-plane movement and causes the reduced minimum interparticle distance ($d_{min}\theta$); and (right) face-to-face contact area after rotation transition (S"), where D" is the movement along the tetrahedra.

DETAILED DESCRIPTION OF THE PREFERRED EMBODIMENTS

Chiral plasmonic materials are typically fabricated lithographically, which is time intensive and extremely difficult to scale up. Self-assembly of nanoparticles requires minimal human intervention and can, in principle, be scaled up with ease and to scale that would be impractical or impossible with lithography. patent, we show the first self-assembly of a planar chiral material. It requires the slow evaporation of an aqueous solution of gold tetrahedron shaped nanoparticles in the presence of a flat surface. Although only ~1 um sized domains were fabricated in this work, larger, possibly macroscopic, 2D flakes of this material could be synthesized through simple modifications to the assembly process, e.g., allowing the aqueous suspension to evaporate over a large bath of an immiscible oil that acts as the "substrate". Flakes of this 2D material show a left handed chirality on one side and when flipped over will show the opposite right-handed chirality. This further simplifies the fabrication process, since left and right chiral materials do not need to generate separately but are, in fact, the same structure just viewed from opposite sides. Methods to embed these 2D assemblies into a solid or flexible polymer matrix would further allow for their facile handling and manipulation. Mechanical stretching of these polymer films would change the interparticle separation and consequently the chiroptical mode supported by the structure, allowing for a possible avenue of post fabrication tunability. Additional details as to the assembly process and chemical mechanism are discussed below.

Results
Purification and Assembly of Gold Tetrahedra

Figure 1:
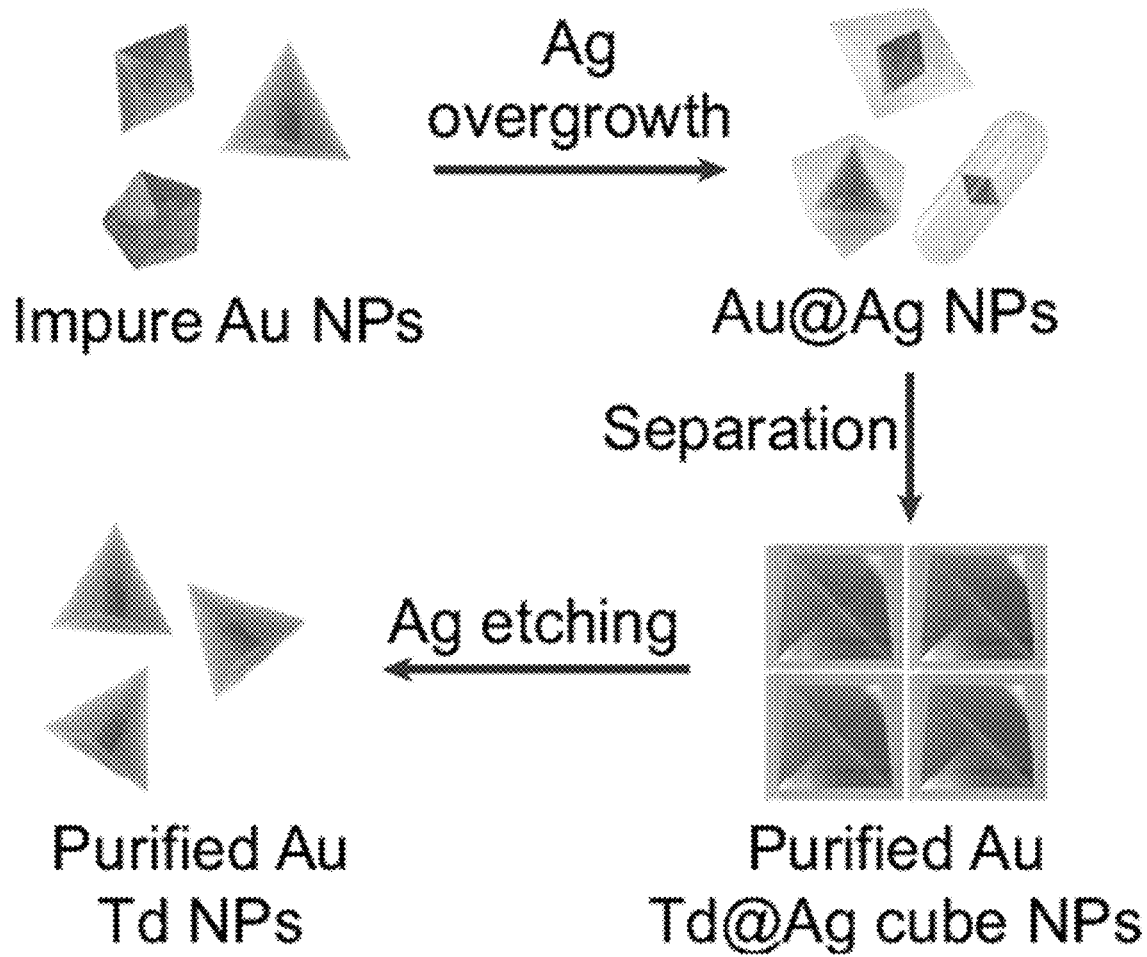
FIG. 1 is a schematic of purification methodology in which Ag shells are grown around as-synthesized samples containing a mixture of particle shapes. Small differences in the internal twinning of Au cores are accentuated in Ag shells, allowing for selective precipitation and separation of a desired morphology, e.g., tetrahedra.
Figure 2:
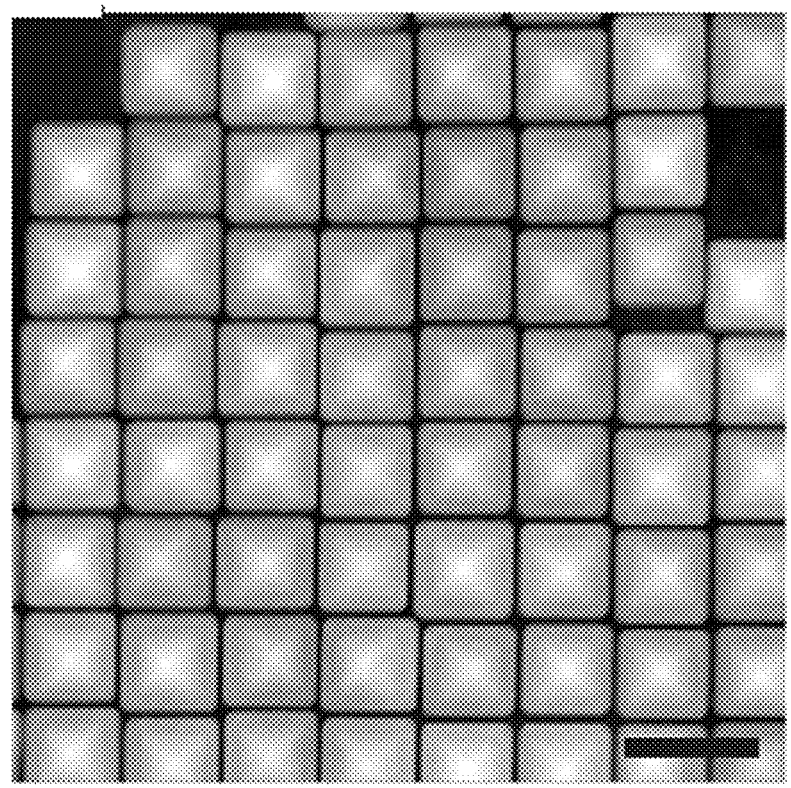
FIG. 2 is an image of purified Au Td@Ag cube particles. The scale bar in FIG. 2 is 50 nm.
Figure 3:
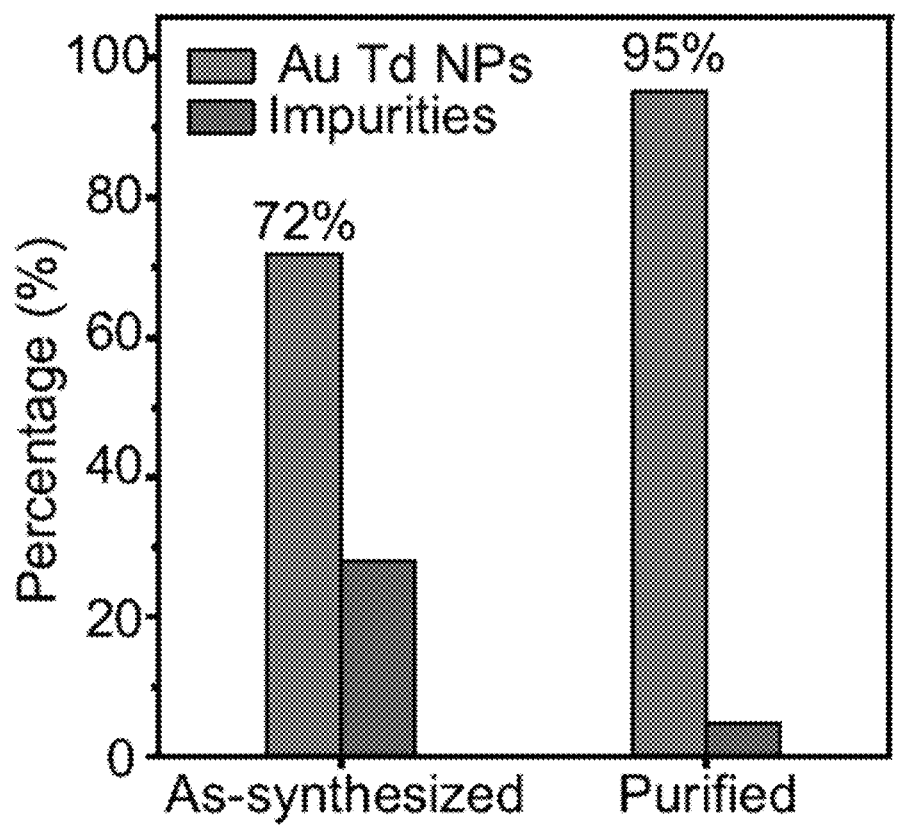
FIG. 3 is a graphical analysis of the distribution of nanoparticle shape products from as-synthesized (n=7,612) and purified samples (n=10,259).
Figure 4B:
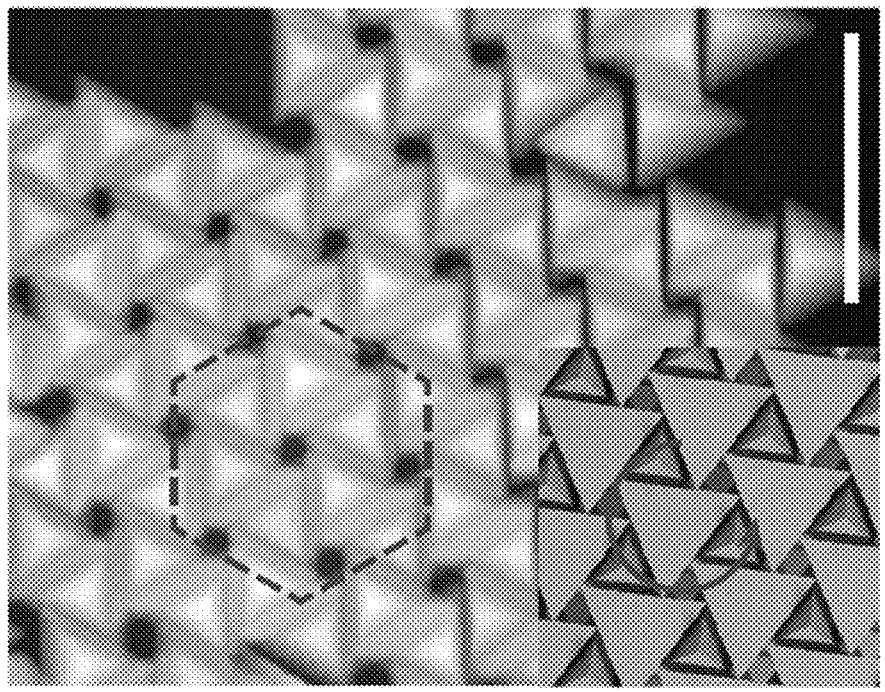
FIGS. 4A and 4B shows images of left and right-handed planar chiral hexagonal superlattices of Td with insets indicating orientation. The scale bar in FIGS. 4A and 4B is 100 nm.
Figure 4A:
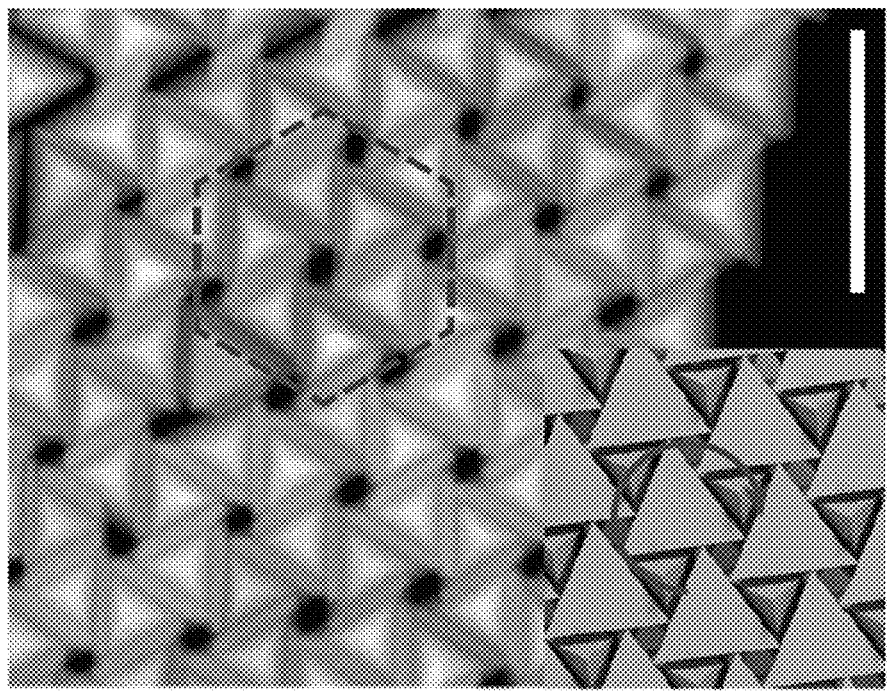
Figure 5:
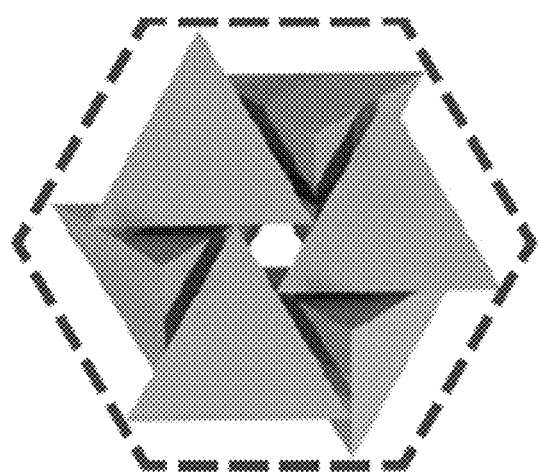
FIG. 5 is a schematic of the 2D chiral hexagonal phase.
Figure 6:
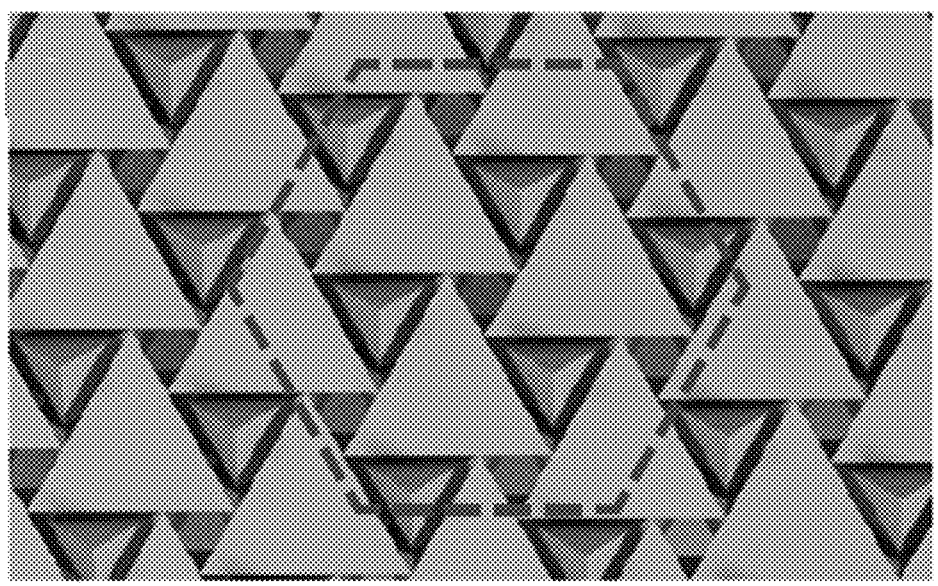
FIG. 6 is a schematic of a hexagonal repeat unit.
Figures 7A, 7B:
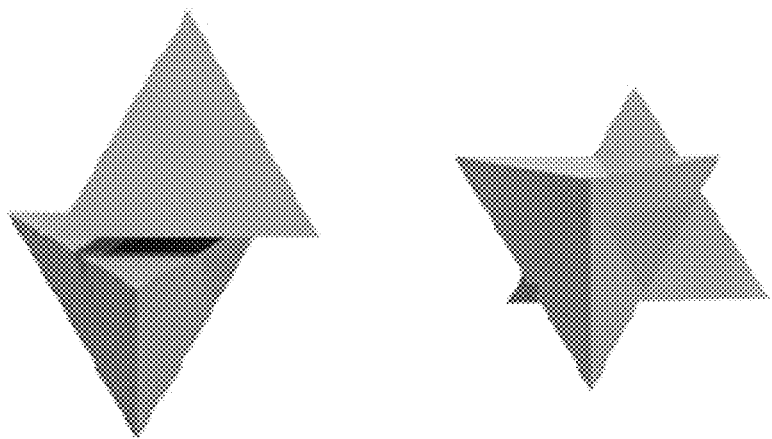
FIG. 7 illustrates top and side views of Td dimers that constitute the structure.
Figure 19:
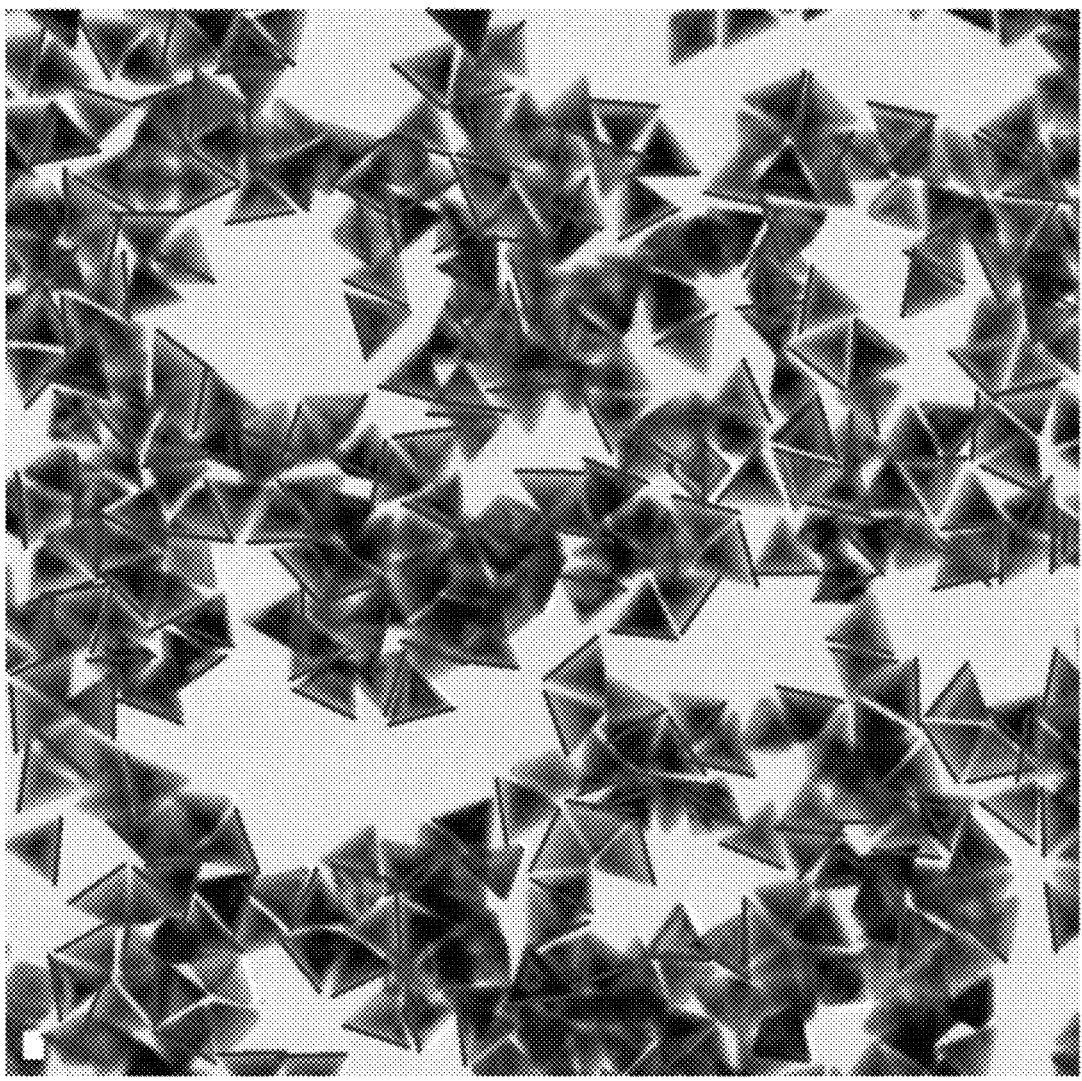
FIG. 19 is a representative image used for the analysis of the size distribution of Au Td NPs after purification. More than 200 measurements were used in the calculation of statistical values FIG. 20 (Table 2) is a dataset of size measurements of Au Td NPs after separation (edge length: nm).

The synthesis of Td-shaped gold particles is fundamentally challenging because the underlying FCC lattice falls within the $O_h$ point group, thus requiring a symmetry breaking mechanism to grow into particles with Td symmetry. As a result, previously-reported syntheses of gold Td particles generate relatively uniform particles but with a population of impurity shapes that compete with and hinder particle crystallization. To address this, we developed a purification strategy based on the overgrowth of Ag around the products of Td nanoparticle syntheses, which acts to exaggerate the small differences in particle shape that would ordinarily make impurities difficult to separate (FIG. 1). The resulting population of particles consist of Au Td cores surrounded by Ag cube shells, Au pentagonally twinned decahedra surrounded by Ag rod shells, and Au bitetrahedra surrounded by Ag right bipyramids (FIG. 2). These products can be separated from one another by selective precipitation after which the Ag shell can be etched to yield pure solutions of the original Au core particle (FIG. 1). Analysis of over 17,000 particles shows that as-synthesized samples contain approximately 72% Td but purified samples contain approximately 95% Td (FIG. 3) with a size uniformity of 1.72% (FIG. 19, FIG. 20 Table 2). Assembly of these particles by slow evaporation of the solvent results in disordered structures for the as-synthesized samples but chiral hexagonally-packed 2D superlattices for the purified samples (FIGS. 4A and 4B).

Figure 8A:
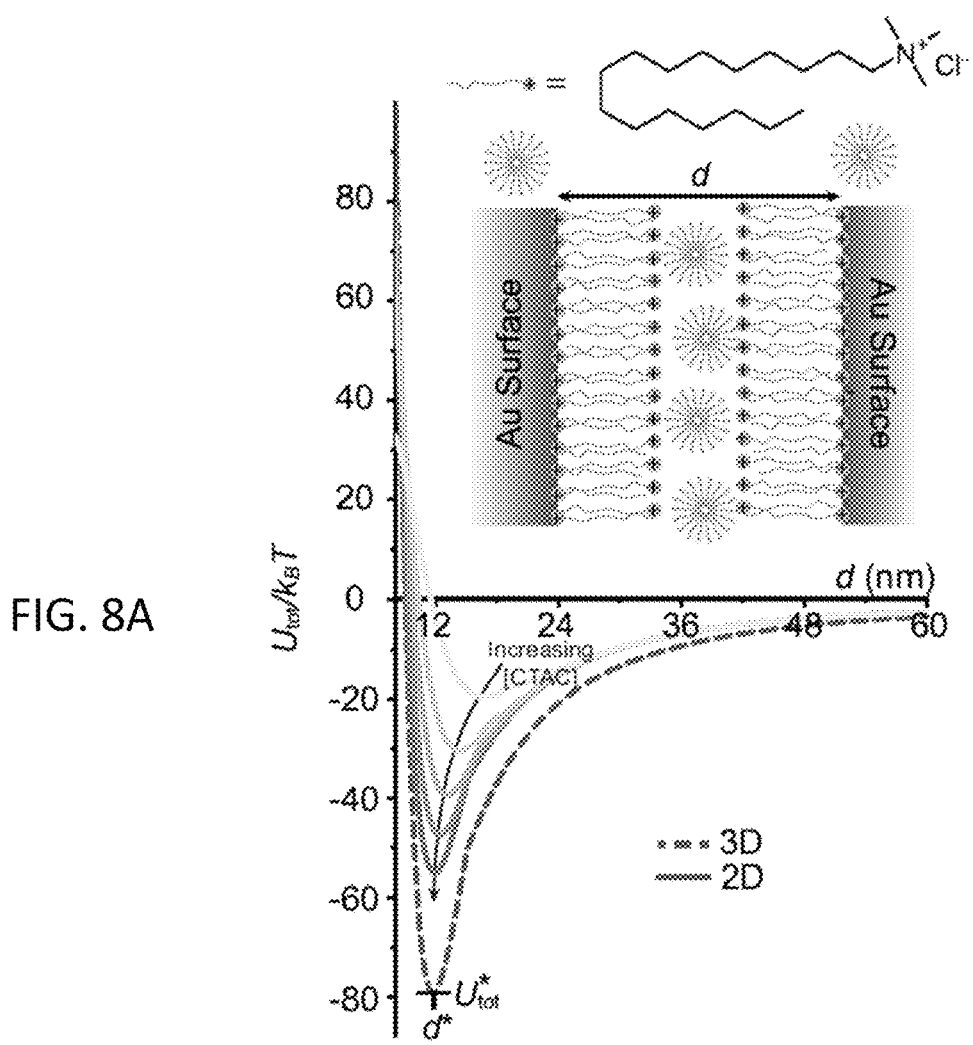
FIG. 8A shows a net pairwise interaction potentials for 2D and 3D chiral superlattices built from Td particles. The inset illustrates the structure of CTAC and its ability to form both solution-phase micelles and positively charged bilayers on Au surfaces.

To understand the formation of hexagonally-packed 2D chiral superlattices, we developed a model for the pairwise interparticle potentials influencing the assembly of gold tetrahedra capped with hexadecyl trimethylammonium chloride (CTAC) ligands based on the well-developed framework of DLVO theory (FIG. 8A, inset). The formation of a positively charged CTAC bilayer on the particle surface is responsible for repulsive electrostatic interactions, while depletion forces mediated by surfactant micelles in solution and van der Waals (vdW) forces and are responsible for attractive interactions. Td particles in aqueous suspension are assembled experimentally by slowly evaporating a droplet placed on rigid substrate (e.g., Si) in a humid environment followed by removal of precipitated salts by chloroform before electron microscopy imaging. Consequently, the CTAC concentration slowly increases over time, resulting in an increase in the attractive depletion forces (via increasing CTAC micelle concentration) and a reduction in the repulsive electrostatic forces (via increased charge screening from electrolytes), both of which result in a gradually strengthening interparticle potential that favors crystallization. These conditions also result in interactions that are snort-ranged (5-10 nm or less) relative to the particle size (66.3 nm) for the vast majority of CTAC concentrations under which assembly is taking place, necessitating calculation of only nearest-neighbor particle interactions in order to capture the energetic stability of different Td superlattices. We use this model to examine how the equilibrium interparticle surface-surface spacing (d*) and interaction potential well depth ($U_{tot}$*) change with CTAC concentration (FIG. 8A), taking into account the changing ionic strength, counterion dissociation, and size of CTA' micelles (see methods and details).

The conditions described above allow for the calculated interaction potentials ($U_{tot}$*) to be interpreted as a measure of the thermodynamic stability of different Td superlattices, consistent with numerous literature reports and several foundational works in statistical mechanics (see methods for details). It should be noted that this approach ignores entropic contributions to the free energy, an assumption that is reasonable since the reduction in translational or rotational freedom in taking particles from gas-like to a solid-like state represents the dominant entropic contribution to the superlattice formation energy and will therefore be similar regardless of the specific configuration of particles in the final structure. It will also be shown that despite this approximation, the theoretical predictions show excellent agreement with our experimental findings (vide infra), further corroborating the validity of the method and suggesting a more detailed treatment (e.g., using Monte Carlo methods) can be the subject of future work. While this model does not provide quantitative predictions for specific Td superlattice parameters, it does allow for a qualitative comparison of the energies of conceivable superlattice structures such that relative thermodynamic stability and the likelihood of different assembly pathways can be evaluated with a high degree of confidence. In general, this framework predicts that particle configurations which maximize face-to-face contact area between aligned, parallel facets of neighboring particles tend to be most favored as they maximize attractive depletion interactions. The structures optimized by these and related directional entropic forces are not necessarily the same predicted by maximum dense packing.

Driving Forces for Two-Dimensional Growth

Figure 8B:
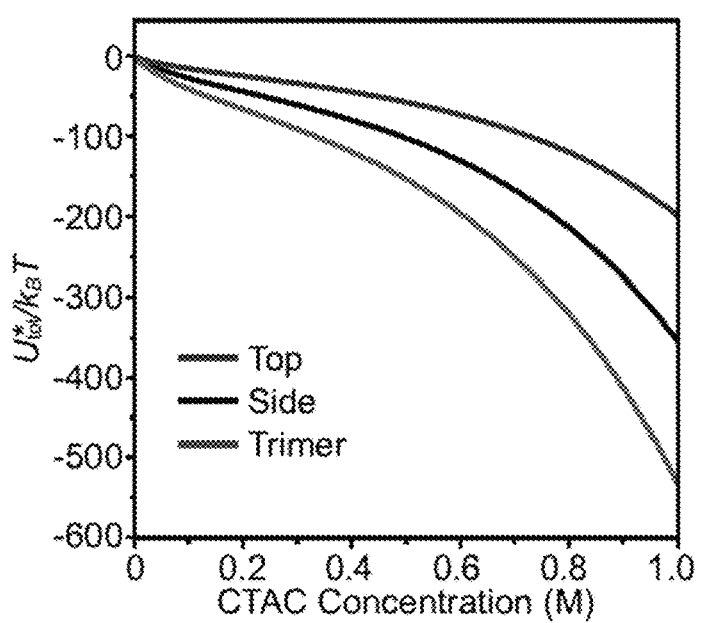
FIG. 8B shows a calculation of attachment energies for a single Td particle to top, side, and trimer positions on a superlattice.
Figure 9:
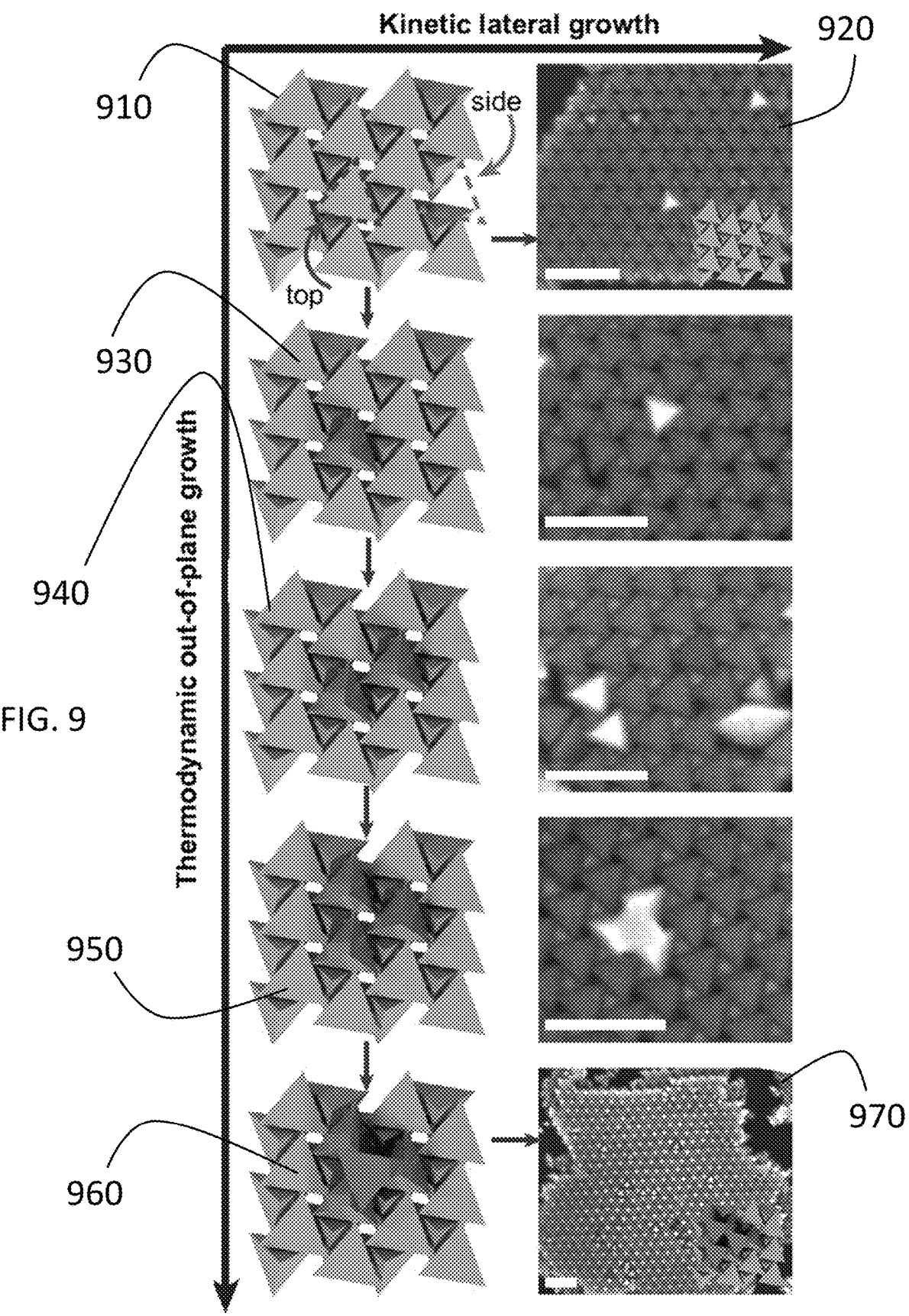
FIG. 9 is an illustration and SEM image of Td attachment at favorable side positions driving lateral (2D) growth (910, 920), an illustration and SEM images of sequential Td attachment at unfavorable monomer (930), dimer (940), and trimer (950) top positions before a favorable tetramer (960) can form, allowing for out-of-plane (3D) growth, and an SEM image (970) of the 3D analogue of planar chiral hexagonal superlattices generated via assembly under thermodynamic conditions. All scale bars are 100 nm.

To understand the origin of the observed preference for two-dimensional growth, we used our model to probe the energetic stability of the chiral hexagonal lattice. Calculations indicate that an analogous 3D version of the structure is indeed more thermodynamically favorable than the 2D structure generated experimentally (FIG. 8A). This finding is important since the chirality of the material is inherently linked to the fact that it is planar, i.e., once 3D growth occurs, the structure ceases to be chiral, even when immobilized on a substrate, because alternating layers have opposing handedness. We next examined the attachment preferences for a single Td particle to different positions on an existing 2D chiral hexagonal lattice (FIG. 8B and FIG. 9). Whereas binding of a Td to a "top" position on the lattice (favoring 3D growth) results in a single nanoparticle neighbor, binding to a "side" position (favoring 2D growth) results in two nanoparticle neighbors and a more favorable net interaction strength (FIG. 8B and FIG. 9). For out-of-plane (3D) growth to occur, three individual Td particles must all bind to adjacent "top" positions, which are individually less favorable, after which a fourth particle can insert into the trimer, forming a stable island (FIG. 9). Since it requires three localized unfavorable coordination steps to allow the equilibrium 3D lattice to form but only one favorable coordination to achieve the 2D lattice, we propose that for this unique lattice symmetry there is a large energy barrier to thermodynamic out-of-plane growth, and a correspondingly large kinetic enhancement for lateral growth. These preferences for 2D vs. 3D growth exist even at low CTAC concentrations and are independent of whether a substrate is present or not.

Because entropic contributions to growth pathways are not consider in our model, we chose to experimentally test the prediction that 2D hexagonal chiral superlattices are kinetic products and their 3D analogues are thermodynamic products by assembling Td particles over longer periods of time, i.e., several days. Indeed, we observed the presence of large 3D structures consisting of alternating stacks of left and right planar chiral sheets and little-to-no 2D structures (FIG. 9, items 960, Fig. S10). Interestingly, images show the formation of nascent 2D island nuclei, consisting of clusters of 1, 2, or 4 Td particles (FIG. 9, items 930, 940, 950). Note that once an out-of-plane adjacent trimer has formed (FIG. 9, item 950), the binding of the 4th particle is considerably more favorable than either "top" or "side" configurations (FIG. 8B). As a result, it is expected that 3 particle clusters would be short-lived, the lack of observation of which is consistent with our results. The broad range of times over which assembly is allowed to take place while still observing 2D superlattices (1 h to 2 days) and the long times necessary to observe 3D growth (5 days) is further evidence of the kinetic enhancement to planar Td assembly.

An additional factor that favors the observed 2D chiral hexagonal phase over alternative 3D structures (e.g., icosahedra) is the presence of a flat substrate onto which the superlattices may nucleate. Experimentally, we find that while a variety of different substrate materials support the formation of chiral hexagonal superlattices (Si, Si3N4, carbon, mica), assembly under identical conditions in the absence of a substrate results in disordered aggregates. Furthermore, assembly on the backside of a silicon wafer shows that the chiral Td phase can form on surfaces whose normal vector is oriented perpendicular to the direction of gravity, indicating that superlattices do not form in solution first and then sediment, but nucleate on the substrate because of attractive forces. Indeed, calculations from our model indicate that at low CTAC concentrations, Td face-substrate interactions are overwhelmingly attractive (i.e., d*:::::0 nm) but become significantly weaker when depletion forces become important at intermediate CTAC concentrations (i.e., d*:::::9 nm. We hypothesize that the regime in which Td are strongly bound face-down to the surface is responsible for pulling particles out of solution and locally concentrating them, allowing for nucleation of 2D superlattice phases. This likely occurs via a similar mechanism discussed above for superlattice growth (FIG. 9) but on a substrate rather than on an existing 2D superlattice, i.e. after a critical Td density is reached such that adjacent trimer configurations appear on the surface (red particles FIG. 9, 950), tip-down insertion of a 4th Td is favorable (red particles FIG. 9, 960) and thus 2D assembled phases can nucleate.

To test this, we experimentally roughened Si substrates, which is known to weaken depletion interactions by reducing the favorable excluded volume gained by depletants 47 Indeed, we observe that when the surface roughness exceeds the depletant size of ~5 nm, chiral Td superlattices either do not form at all or exist as small, disordered domains. This is consistent with our model, which indicates that a weakened depletion interaction between Td and substrates results in a nucleation regime that is shorter in duration and has weaker particle-particle interactions. Therefore, substrates act to seed heterogeneous nucleation of 2D Td superlattices, after which kinetically-enhanced lateral growth (FIGS. 8 and 9) further disfavors the formation of 3D assemblies.

Comparison of Chiral and Achiral 2D Superlattices

Figure 10A:
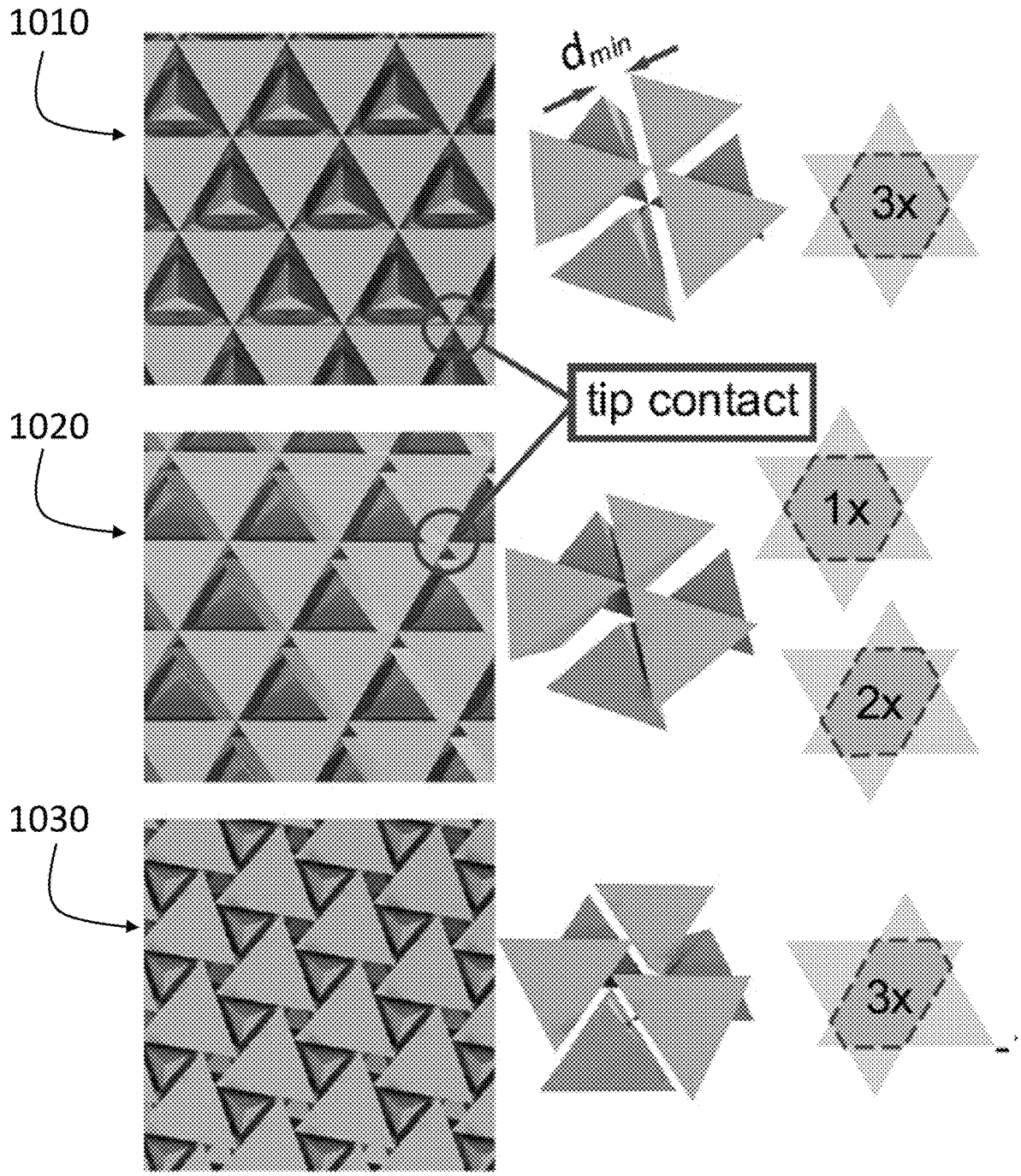
FIGS. 10A-10F illustrate understanding the stability of different 2D tetrahedra lattices.
Figure 10B:
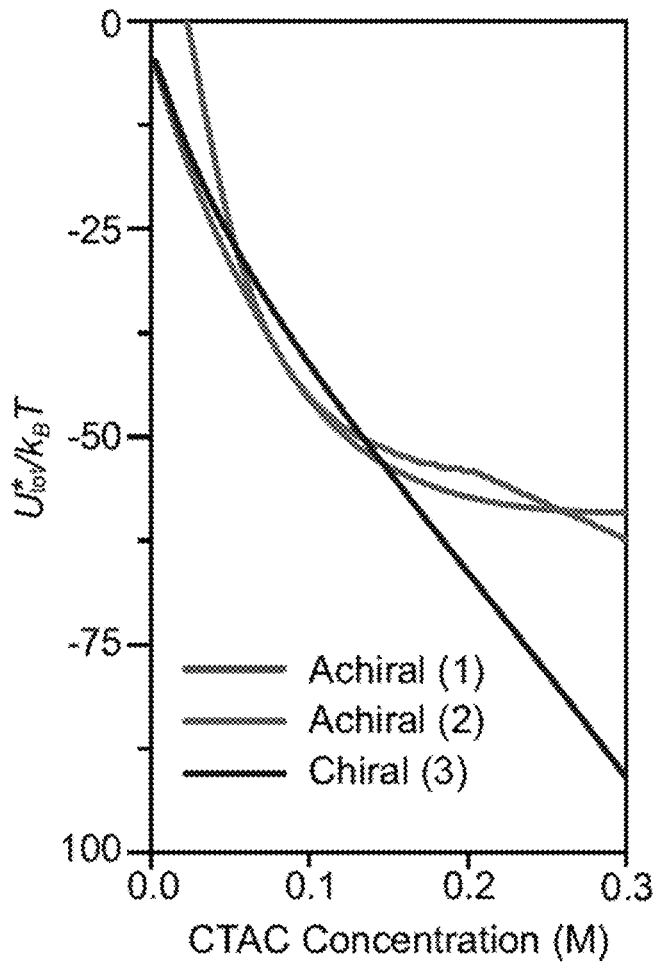
Figure 17:
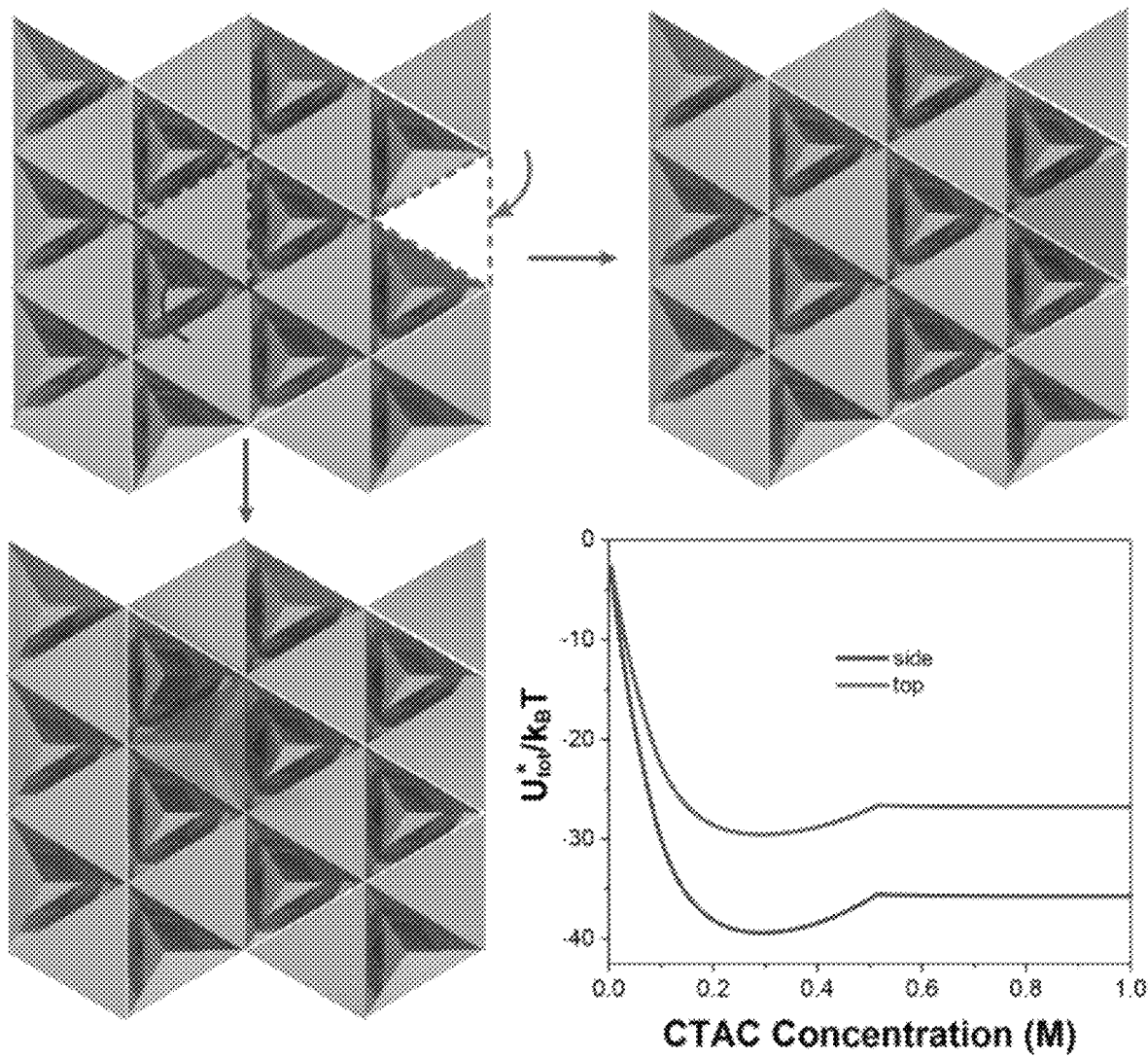
FIG. 17 is a schematic and calculation of the stability of tetrahedron at top or side positions for the achiral (1) structure, demonstrating kinetically-preferred lateral growth. Asymptotic behavior arises because of a $d_{min}$ that prevents further densification of Td at higher CTAC concentrations.
Figure 18:
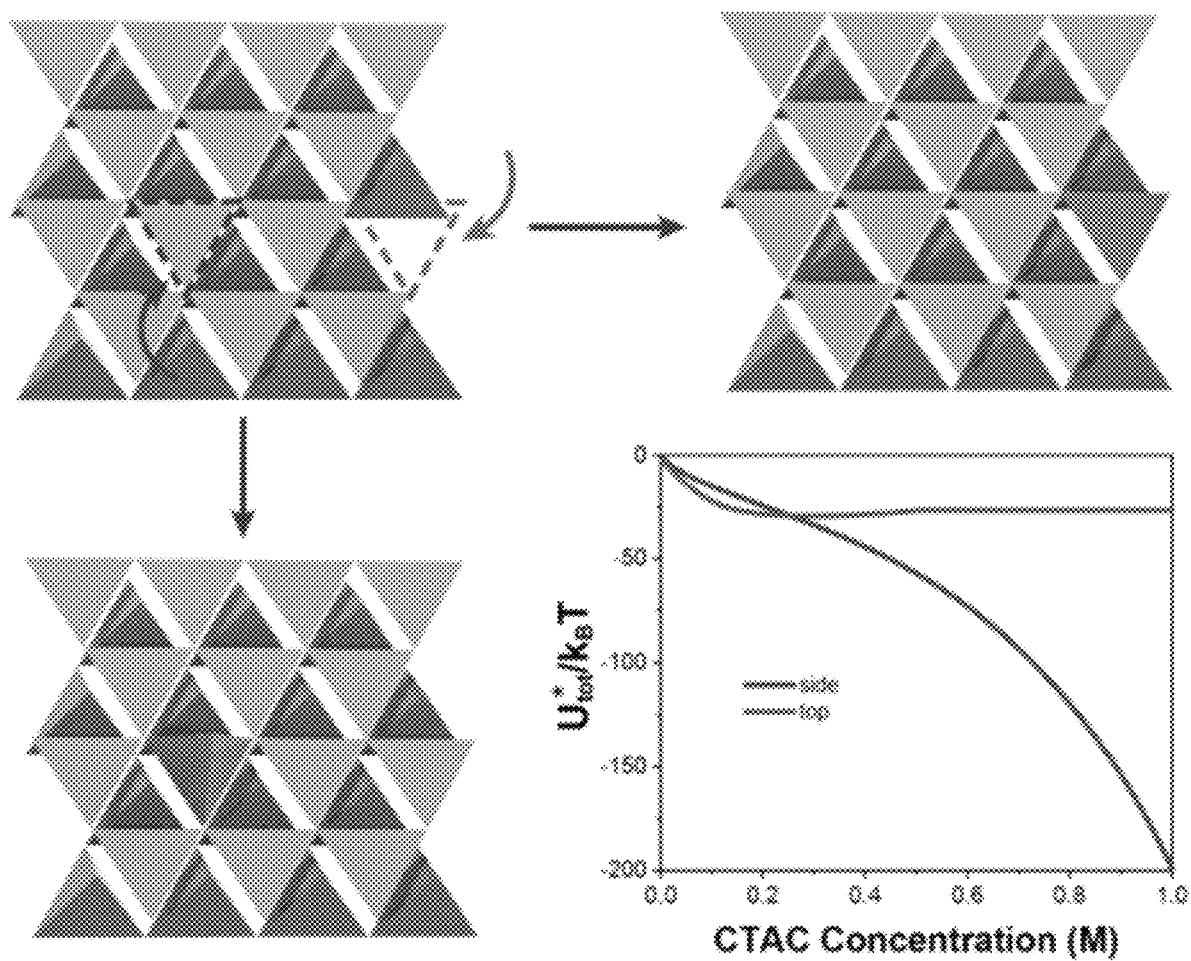
FIG. 18 is a schematic and calculation of the stability of tetrahedron at top or side positions for the achiral (2) structure, demonstrating kinetically-preferred lateral growth. Asymptotic behavior arises because of a $d_{min}$ that prevents further densification of Td at higher CTAC concentrations.

To understand the appearance of the chiral hexagonal structure, we next examined a series of related 2D superlattices of packed Td particles, all of which exhibit kinetically-enhanced lateral growth as discussed above (FIGS. 17 and 18). As a function of CTAC concentration, we compared the energy minimum of three different 2D phases: (1) an achiral hexagonal structure in which all three neighboring particles have identical hexagon-shaped overlap areas (FIG. 10A, 1010), (2) an achiral monoclinic structure with one nearest neighbor of hexagon-shaped overlap and two next-nearest neighbors with elongated hexagonal parallelogram-shaped overlap (FIG. 10A, 1020), (3) the chiral hexagonal structure discussed above with all three neighboring particles having identical elongated hexagonal parallelogram-shaped overlap (FIG. 10A, 1030). Of the three, the achiral structure (2) shows a preference for three-dimensional growth and is the least favorable at low-to-moderate CTAC concentrations and is therefore unlikely to be relevant to the formation of 2D chiral hexagonal phases (FIG. 10B and FIG. 18). Interestingly, achiral structure (1) has the greatest facet overlap area and would therefore presumably pack into the lowest energy arrangement. However, as the equilibrium interparticle spacing (d*) decreases with increasing CTAC concentration, the tetrahedron tips eventually come into physical contact, sterically preventing further attraction between particles (FIG. 10A, 1010). Thus, a geometric constraint sets a minimum interparticle spacing ($d_{min}$) that, if reached, severely limits further increases in the magnitude of the interaction potential (FIG. 10A, 1010; FIGS. 10B and 18). The consequence of this effect is that the chiral hexagonal phase (3) becomes more favorable than the achiral (1) phase at inter-mediate CT AC concentrations and remains the most stable structure until the solvent fully evaporates (FIG. 10B).

Figure 10C:
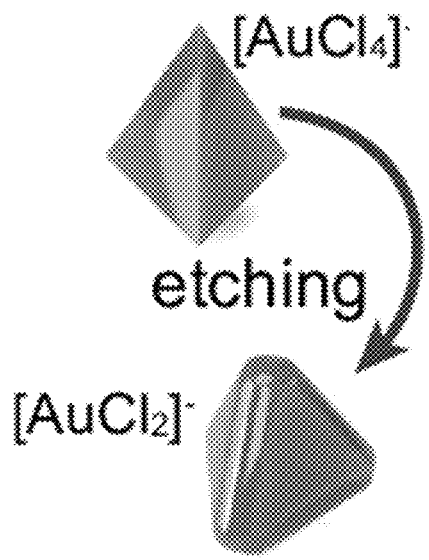
Figure 10D:
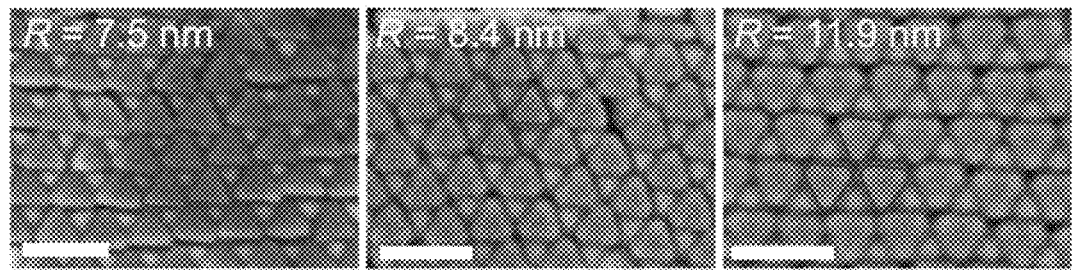
Figure 10E:
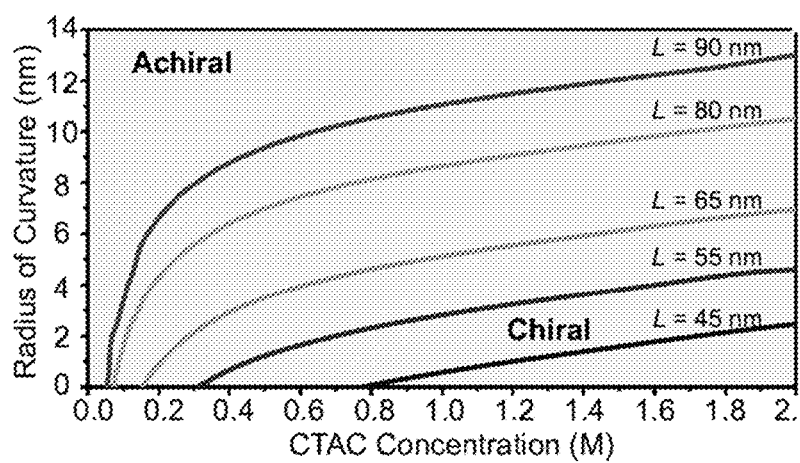
Figure 10F:
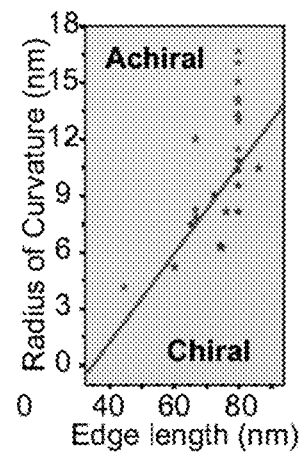

To test the importance of particle-based geometric constraints on the formation of the chiral hexagonal phase, we hypothesized that chemically truncating the tips of tetrahedra nanoparticles through a selective oxidation reaction would result in a decreased d,n and a more favorable achiral (1) phase (FIG. 10C). For tetrahedra with tips of a high radius of curvature (R), the achiral hexagonal structure (1) is indeed observed exclusively in electron microscopy images (FIG. 10D). We next corroborated this result by calculating the value of $d_{min}$ for tetrahedra with tips of different radii of curvature and generated the resulting interaction potentials. The model indeed confirms that for particles with rounded tips, the decreased $d_{min}$ and greater facet contact area allows for the achiral phase to become more favorable (FIG. 10E). Thus, for a particle of a given size, increasing the tip radius of curvature results in a transition from the chiral to the achiral phase. Although this phase transition point is dependent on the amount of CTAC present in solution (FIG. 10E), our electron microscopy images are collected when samples are completely dried and therefore represent a snapshot of the state of the system at an exceedingly high value of CTAC (rightmost part of FIG. 10E). We take this endpoint of the assembly process to be at ~2.0 M CTAC, as this is both the solubility limit of CTAC determined experimentally and the point at which attractive interactions approach 104 kBT when particle reorganization is exceedingly unlikely. Using this definition, the model allows us to generate a phase diagram that predicts whether achiral (1) or chiral (3) structures are preferred at the endpoint of the assembly process based on the morphological parameters of the particles (blue line FIG. 10F). Experimental electron microscopy images taken for Td particles of differing size and tip radius of curvature show excellent agreement with the model predictions (FIG. 10F). These findings indicate that the formation of chiral superlattices may be unusually sensitive to the geometry of the constituent building blocks, highlighting the importance of synthesis and purification strategies that generate and maintain sharp-tipped particles (see FIGS. 1-7).

Rotation of Td within Planar Chiral Superlattices.

Figure 11A:
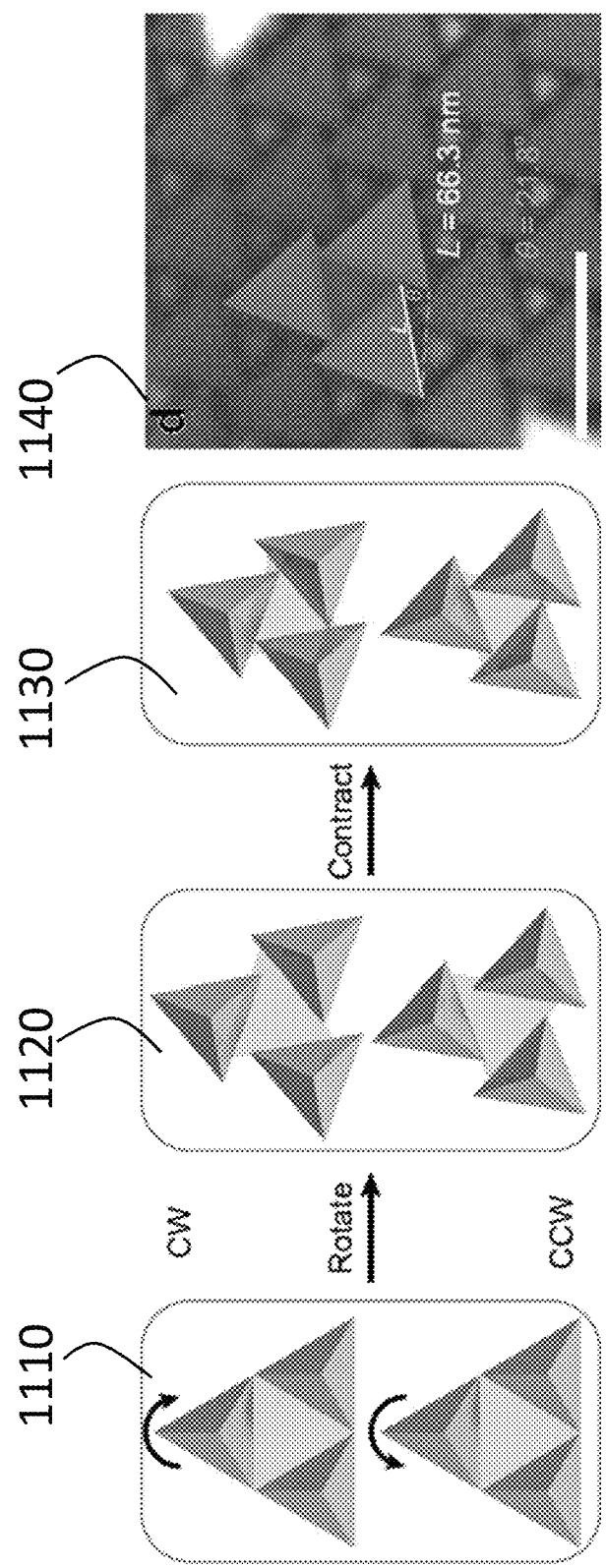
FIGS. 11A-11D show that particle rotation explains the achiral-chiral phase transition.
Figure 11B:
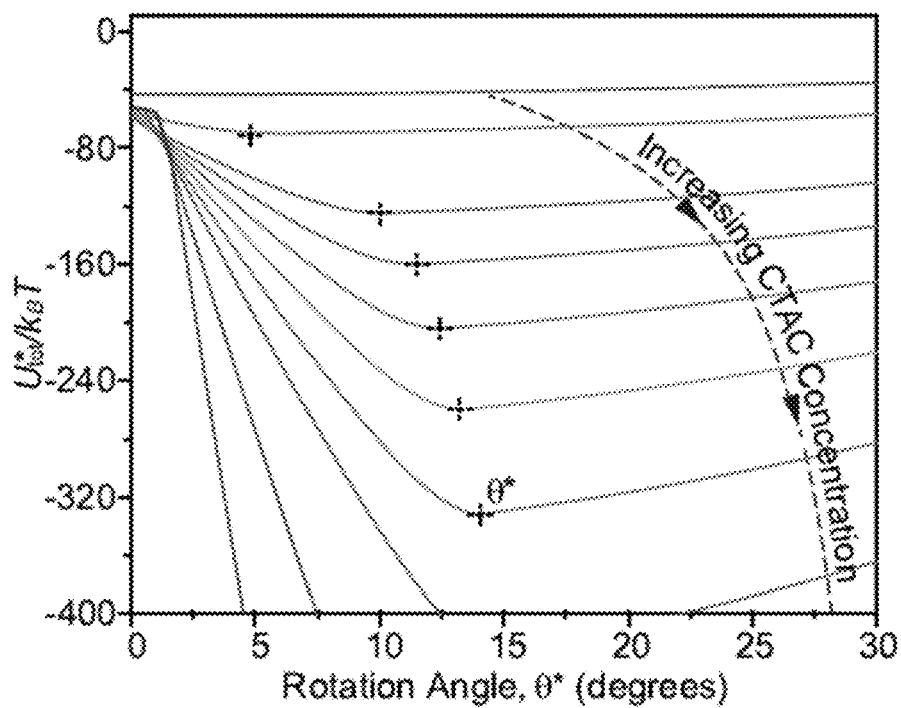
Figure 11C:
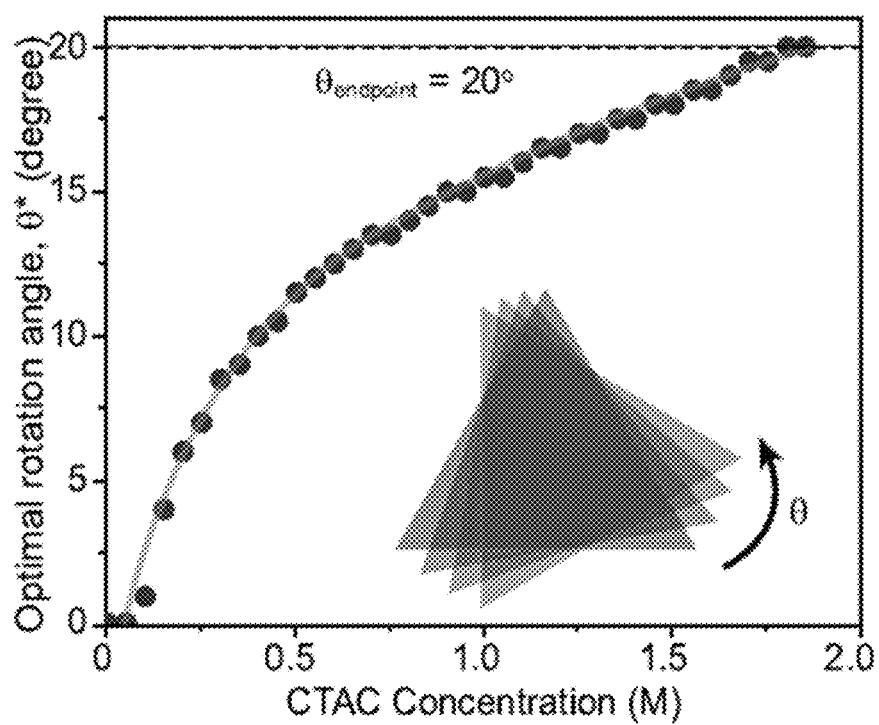
Figure 11D:
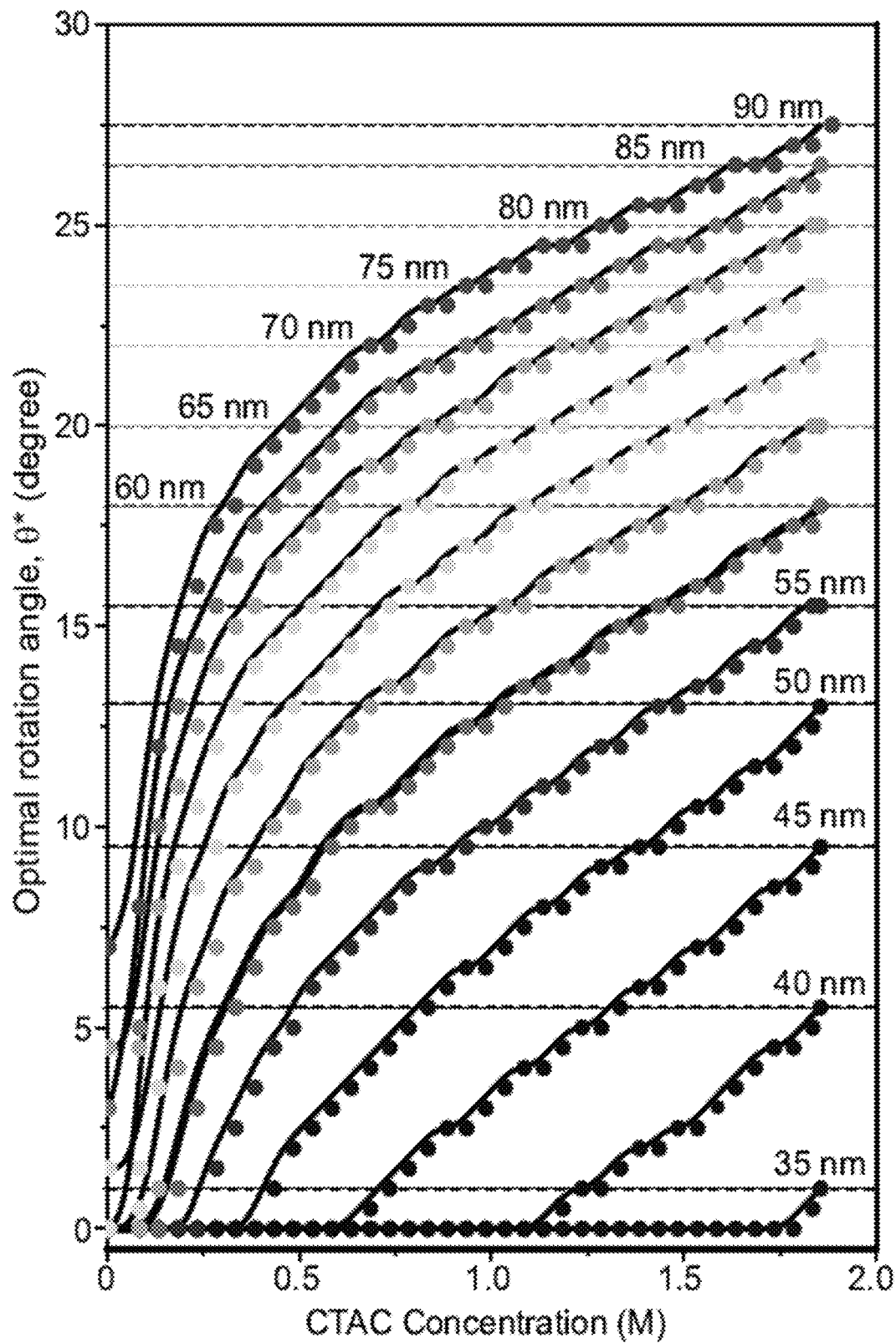
Figure 12A:
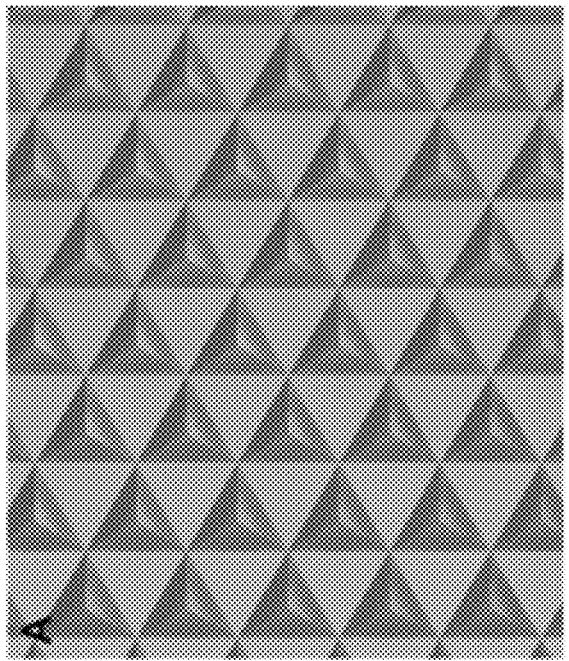
FIGS. 12A-12E are schematic illustrations and 3D models of the achiral (1) structure.
Figure 12B:
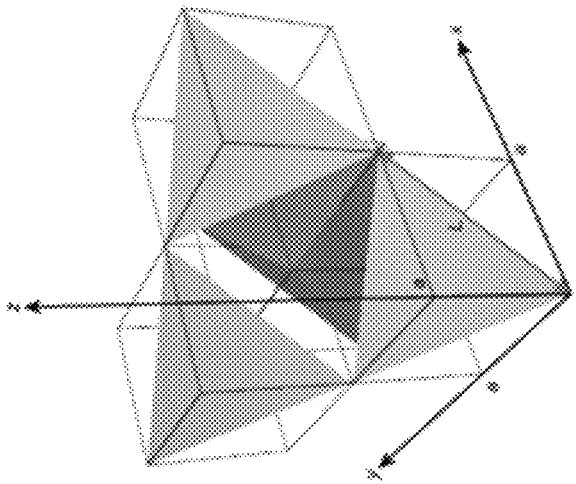
Figure 12E:
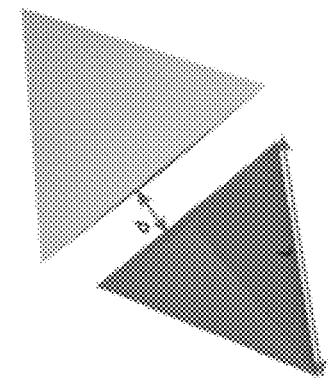
Figure 12D:
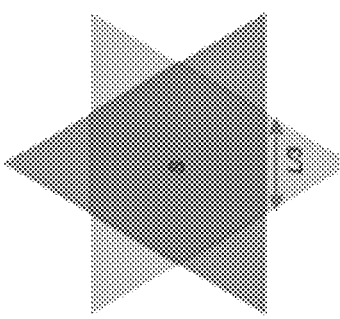
Figure 12C:
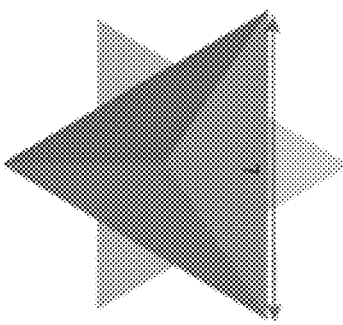
Figure 13A:
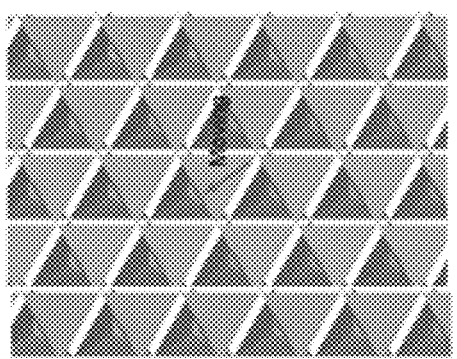
FIGS. 13A-13F are schematic illustration and 3D models of the achiral (2) structure.
Figure 13B:
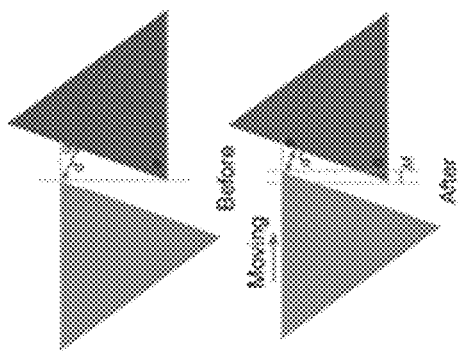
Figure 13C:
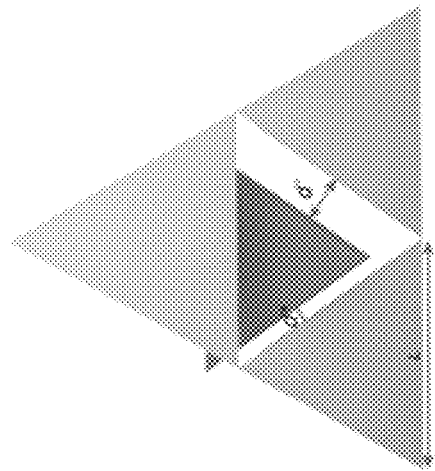
Figure 13D:
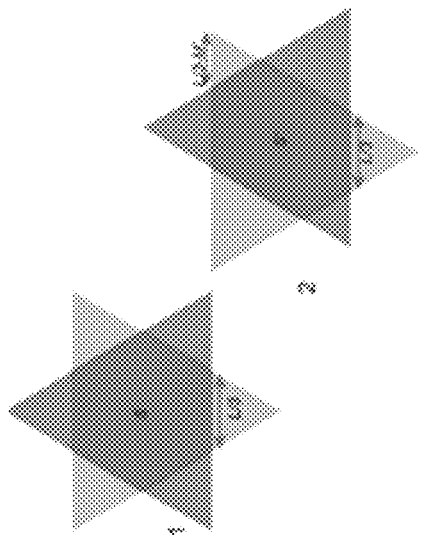
Figure 13E:
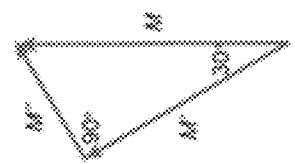
Figure 13F:
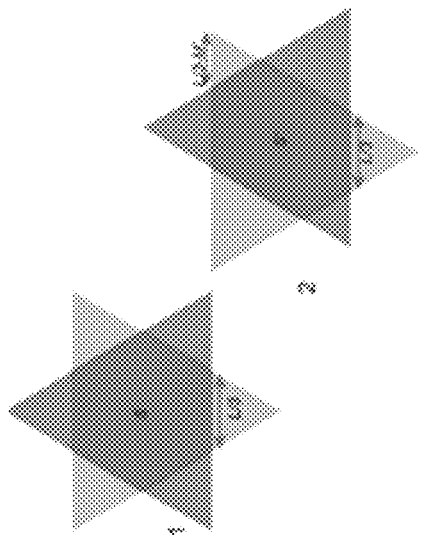
Figure 16A:
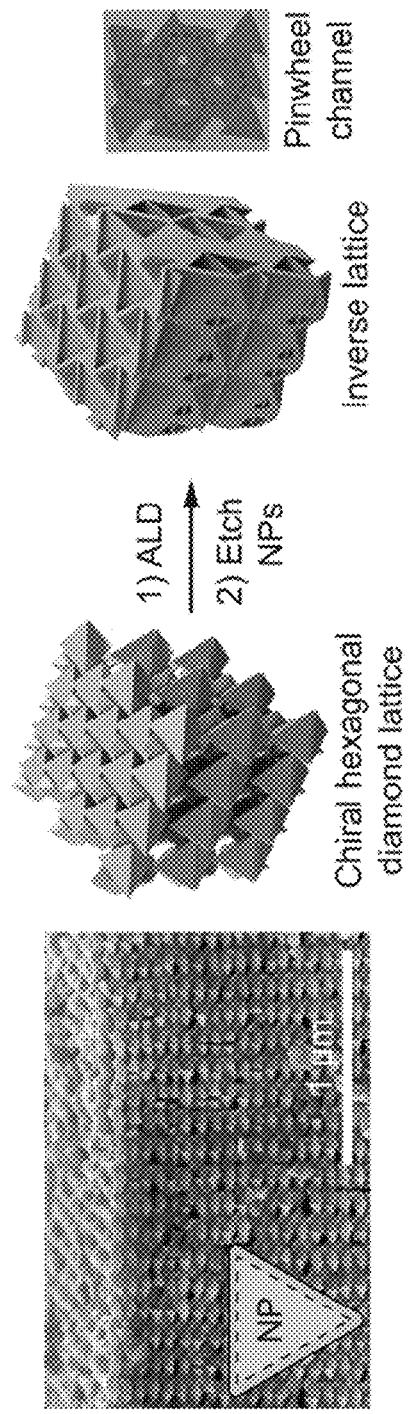
FIGS. 16A and 16B are SEM images of gold nanoparticle (NP) superlattice with particle hydrodynamic shape as inset and schematics of the formation of chiral mesoporous oxides for hexagonal diamond (FIG. 16A) and high pressure Li (FIG. 16B) phases of assembled tetrahedron-shaped (Td) NPs.
Figure 16B:
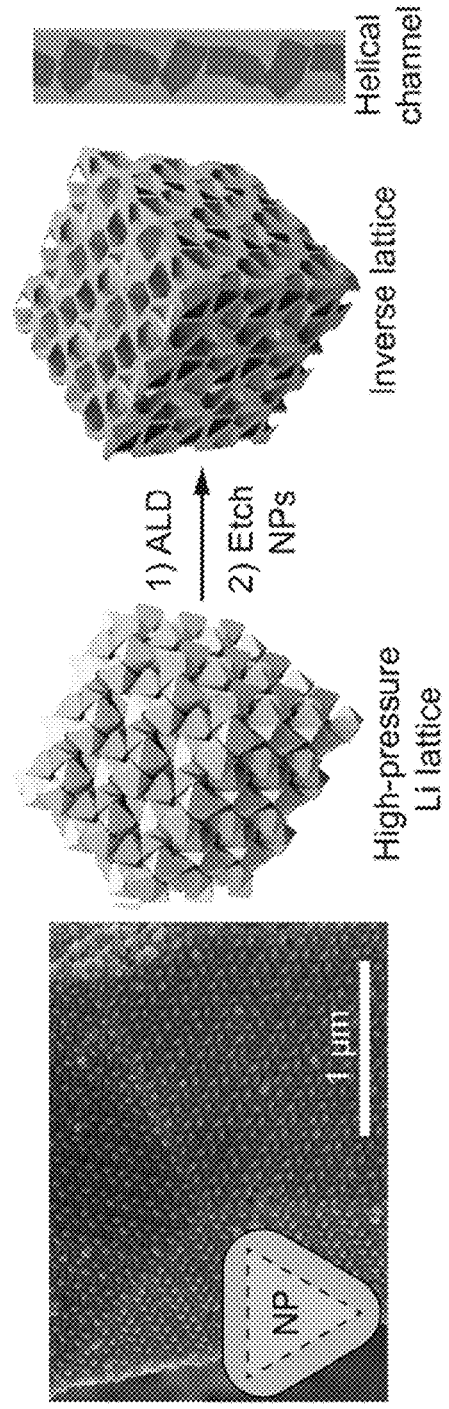

The comparison of different 2D tetrahedron superlattices indicates that although chiral structures are favorable at high CTAC concentrations, the achiral structure is most stable at low CT AC concentrations (FIG. 10B). Since Td are assembled through slow evaporation and thus transition from low to high CTAC during crystallization, we hypothesized that, even for sharp-tipped particles, 2D superlattices first nucleate in the achiral phase and then transition to the chiral configuration. We propose a mechanism for this transition, in which Td packed into the achiral structure may adopt chiral configurations via rotation about their axis that is perpendicular to the plane of the 2D superlattice (FIG. 11A, 1110 and 1120). This rotation would avoid the minimum spacing imposed by the achiral phase ($d_{min}$), allowing for closer interparticle distances and thus more favorable interactions (FIG. 11A, 1130). To evaluate the energetics of this process, we derived a geometric expression for $d_{min}$ as a function of Td rotation angle, θ (FIG. 11A, 1140), allowing us to calculate equilibrium interaction energies ($U_{tot}$*) for different values of A over the range of CTAC concentrations (FIG. 11B); a rotation angle of 0° corresponds to the achiral structure while all values between 0° and 30° indicate a morphology in the hexagonal chiral symmetry class. The consequence of Td rotation is a decreased $d_{min}$, leading to closer surface-surface distances and more favorable interactions, but also a decreased facet contact area, leading to less favorable interactions. Thus, a balance between these influences results in an optimal rotation angle (θ*) at a particular CTAC concentration, given by the minimums in the curves shown in FIG. 11B. Plots of θ* as a function of [CTAC] show the final rotation angle of Td chiral superlattices at the endpoint of the assembly process (i.e., ~2.0 M CTAC) which can be compared to experimental electron microscopy images; the measured value of −21.8° shows excellent agreement with the prediction of −20° for the 66.3 nm edge length Td particles used throughout most of this work (FIG. 11C). Since either clockwise or counterclockwise rotation will lower the energy of the system degenerately, there will emerge equal number of left and right enantiomers of 2D chiral crystals, consistent with our observations (FIGS. 4A-4B and 11A. Interestingly, extending this calculation to tetrahedra with a range of sizes shows that the emergence of the chiral phase via rotation is only favorable for Td with edge lengths above ~35 nm (FIG. 11D), which may explain why this symmetry has not been observed in previous reports on the assembly of tetrahedron-shaped semiconductor nanoparticles which tend to considerably smaller, on the order of 5-10 nm11,34.

Discussion

These data allow for a stepwise formation mechanism to take shape for the assembly of 2D chiral Td superlattices as their interactions become move attractive over time during the evaporation of the solvent: (A) initial nucleation of the achiral (1) phase at low CTAC concentrations as a result of attractive particle-substrate interactions (FIGS. 10A-10F), (B) kinetic enhancement of 2D lateral growth over out-of-plane growth, resulting in planar superlattices (FIGS. 8 and 9), (C) densification of the achiral (1) phase until Td tips come into physical contact and set a minimum interparticle spacing ($d_{min}$), sterically preventing the achiral (1) configuration from lowering its energy (FIG. 10A-10F), (D) nucleation of the chiral hexagonal phase within the achiral phase through random clockwise or counterclockwise rotation of Td, resulting in a closer interparticle spacing at the expense of a lower facet overlap area that nonetheless results in a net decrease in energy (FIGS. 10A-10F and 11A-11D), (E) further Td rotation according to the optimum value (θ*) until the final assembly endpoint is reached and samples are dried and static on substrates (FIGS. 11A-11D).

These results establish the experimental parameters and fundamental mechanisms for the formation of 2D chiral superlattices. Whereas high-symmetry achiral building blocks, such as spheres and cubes, may assemble into chiral structures, they generally require the introduction of external fields or other chemical processes by which the symmetry of their interactions may be broken 2, 12. Alternatively, we have shown that tetrahedron-shaped particles, whose morphologies are intrinsically lower symmetry, can self-assemble into super-lattices that exhibit spontaneous 2D chirality, contingent upon the presence of sharp tips after their synthesis and purification. Crystals with this geometry are absent from the extensive theoretical literature on the packing of tetrahedra, suggesting an even richer phase space than what was previously thought may remain to be discovered. Structures of this sort are particularly attractive as a means to generate chiroptical films and meta-materials with minimum human intervention at maximum production scale.

Methods

Chemical reagents: Hydrogen tetrachloroaurate hydrate (HAuCl4, trace metal basis), L-ascorbic acid (AA), sodium borohydride (NaBH4), silver nitrate (AgNO3, trace metal basis), hydrogen peroxide (H2O2, 30 wt %) and ammonia solution (NH3 H2O, 28~30 wt %) are all purchased from Sigma-Aldrich and hexadecyltrimethylammonium bromide (CTAB) and hexadecyltrimethylammonium chloride (CTAC) are purchased from TCI. All reagents are used as received. Milli-Q water (0.22 µM pore size, 18.2 M (2 cm at 25° C.) was used for all syntheses and purification and before each growth, all glassware were treated with aqua regia and rinsed with excess water.

Synthesis of small gold seeds: The synthesis of small gold seeds follows Xia's method[35]. First, HAuCl4·3H2O solution (10 mM, 250 µL) and 5 mL of 0.2 M CTAB solution are added to 4.75 ml Milli-Q water. Next 0.6 mL of freshly made ice-cold 10 mM NaBH4 solution was quickly injected into the above solution under vigorous stirring. The solution color changed from yellow to brownish-yellow, and the stirring was stopped after 2 min. This seed solution was then aged at 27° C. for 3 hours before use.

Synthesis of 10 nm seeds: Aqueous solutions of CTAC (200 mM, 20 mL), L-AA (100 mM, 15 mL), and an aqueous HAuCl4 solution (0.5 mM, 20 mL) were mixed, followed by injection of the initial, CTAB-capped Au seeds (500 µL)[35]. The reaction was allowed to continue at 27° C. for 15 min. The product was collected by centrifugation at 21300 ref for 90 min, and then washed with water once and redispersed in 10 mM CTAC solution for further use and characterization. This 10 nm seed sample usually contains twinned products with the purity of single-crystalline seeds of ~85%.

Synthesis of tetrahedra nanoparticles (Td NPs): The synthesis of tetrahedra nanoparticles was adapted from Xia's method with syringe pump to control the flow of an aqueous HAuCl4 solution[35]. In a typical synthesis of tetrahedra with edge length around ~66 nm, aqueous solutions of CTAC (200 mM, 27 mL), CTAB (100 mM, 9 mL), L-AA (100 mM, 36 mL), and the 10 nm seed solution (2.0 OD, 2 mL) were mixed with 34 mL of Milli-Q water in a 250 mL glass flask, followed by dropwise addition of aqueous HAuCl4 solution (0.5 mM, 60 mL) using a syringe pump at an injection rate of 6 mL/h. The reaction was allowed to proceed at 27° C. for 10 min after the last injection. The final product was collected by centrifugation at 12500 ref for 15 min and washed with water once to remove excess reagents. The size of the tetrahedra can be controlled by the amounts of seeds in growth solution and HAuCl4 solution.

Overgrowth of Au particles with Ag shells: After centrifugation, the products of the Au Td syntheses were then resuspended in CTAC (80 mM, 31.25 mL) in a 50 ml. Falcon centrifuge tube. Afterwards, L-AA (100 mM, 5.25 mL) and AgNO3 (10 mM, 12.5 mL) were added and mixed thoroughly. This mixture was heated at 65° C. for 4 h with a shaking rate of 1000 rpm. After overgrowth, the Au Td NPs were embedded in Ag cubes, decahedra NPs formed Ag nanorods (NRs), and bitetrahedra NPs became Ag right bipyramid (RBP) NPs. The Au decahedra@Ag nanorods precipitate from the growth solution allowing for the remaining supernatant to be collected.

Purification of Au Td@Ag cube NPs: To improve the purity of Au Td@Ag cube NPs, particle self-assembly was used to selectively precipitate impurities. For the synthesized Au Td@Ag cubes mentioned above, the edge length is around 70 nm. Based on an empirical interaction potential equation, when the energy reaches 4~5 kBT, NPs with large contact area will assemble into extended structures and precipitate from solution. Based on these calculations, the impure Au Td@Ag cube NP samples were suspended in CTAC (35 mM, 40 mL) at room temperature. Assemblies precipitated out overnight and the supernatant containing impurities was carefully removed. The selectively assembled Au Td@Ag cube NPs were then re-dispersed in water and brought to a CTAC concentration of 32 mM to allow for further rounds of purification. Four cycles of selective precipitation were necessary to reach >95% purity of Au Td@Ag cube NPs.

Selective etching of Ag shells on Au Td@Ag cube NPs: To remove the Ag shell on purified Au Td@Ag cube NPs, samples were re-dispersed in CTAB (50 mM, 20 mL), followed by addition of NH3 H2O solution (28~30 wt %, 1 mL) and H2O2 (30 wt %, 1 mL). The oxidation reaction driven by NH3 H2O/H2O2 has been widely used in selective etching of Ag and showed no impact on the shape of the final Au Td particles. Indeed, it is likely that the formation of a AuAg surface alloy after the overgrowth creates a tolerance for the NH3 H2O/H2O2 etching solution, facilitating preservation and stabilization of the sharp tips of Au Td NPs. After etching at room temperature overnight, the sample was centrifuged at 13500 ref for 15 min and then washed with water once to remove excess Ammonia/H2O2 solution. The Au Td NP pellet was resuspended in 50 mM CTAC and aged at room temperature for 12 h to ensure exchange of CTAB to CTAC. This solution was centrifuged at 13500 ref for 15 min and washed with 10 mMCTAC twice for further use.

Controlled rounding of the tips of Au Td NPs: Purified Au Td NPs were suspended in 50 mMCTAB at a particle concentration of 2 OD at $\lambda_{mm}$ (~643 nm). To control the radius of curvature, different volumes of HAuCl4 solution (1 mM) were added to 0.5 mL Au Td NP samples in 1.5 mL centrifuge tubes. The final concentration of $Au^{3-}$ was 1 µM, 2 µM, and 3 µM which drives a mild but tip-selective comproportionation reaction. After etching at 40° C. for 4 h, rounded Au Td NPs with tips of different radii of curvature were obtained. Samples were centrifuged at 13500 ref for 3 min to remove excess reagent, aged in 50 mM CTAC overnight to ensure CTAB to CTAB ligand exchange, and then washed with 10 mM CTAC twice for further use.

Assembly of Au Td NPs on TEM grids: If purified Au Td NPs are allowed to dry slowly, excess CTAC will crystalize on the TEM grid, decreasing the image quality. To avoid this problem, Au Td NPs in CTAC solution (~2 OD, 100 µL) were centrifuged once and resuspended in water (1.4 mL) to dilute the amount of CTAC. A ~10 µL drop of this solution was placed on the TEM grid and allowed evaporate at room temperature. Since the concentration of remaining CTAC increases during evaporation, the high values necessary to favor the chiral hexagonal phase of Td NPs are still reached. Before taking images, the TEM grid was rinsed carefully with chloroform to remove excess CTAC and increase the contrast of corresponding TEM images.

Assembly of Au Td NPs on silicon wafers: Silicon wafers were first washed with acetone, isopropanol, and water with ultrasonication for 10 min each and dried with nitrogen gas. The clean silicon wafers were transferred into a small petri dish (diameter of 5 cm) and purified Au Td NPs in 10 mM CTAC (15 µL) were carefully pipetted onto the surface of a silicon wafer. To decrease the evaporation rate and increase the quality of the assemblies, samples were placed inside of a glass container with a cup of water to increase the humidity. Once dry, crystalized CTAC was removed by adding 10 µL water onto the silicon wafer and wicking it away with filter paper. After 2~3 times, a golden film is observed indicating exposure of the AuTd NP assemblies.

Roughening of silicon wafers. Clean silicon wafers were roughened by reactive ion etching (RIE, power of 100 W) under $CF_4$/oxygen (10/5 sccm) gases with a pressure of 250 mTorr using different etching times (from 1 to 5 min). Surface roughness was measured by the DektakXT stylus profilometer.

Interaction Potential Model: The theoretical model developed for tetrahedron assembly considered the net pairwise interaction potential between particles to be the additive contribution from van der Waals (vdW), electrostatic (el), and depletion forces (dep). To simplify the geometry of the model, we approximate the total potential for a single particle to be the sum of individual facet interaction energies:

$$U_{tot} = \sum_{Facets} U^{Face-Face} = \sum_{Facets} \left( U_{vdW}^{Face-Fac} + U_{el}^{Face-Face} + U_{dep}^{Face-Face} \right) \quad (1)$$

Because the tetrahedra used in this work are bounded by flat, crystallographically-well-defined surfaces, this allows for simplified expressions for the van der Waals, electrostatic, and depletion forces that consider the interaction of two planar surfaces each with an area, A. This method of decomposing the energy of a polyhedral particle into its individual flat facet interactions is appropriate under the present conditions because all of the forces involved are short-ranged relative to the ~70 nm particle size. Thus, considering only nearest-neighbor effects is sufficient and the interaction energy per particle is proportional to the crystal energy. For example, the high electrolyte concentration (2.0 M) creates an inverse Debye screening length <1 nm, the micelle diameter (which sets the maximum distance of the depletion interaction) is ~5 nm, and 90% of the van der Waals attraction can be captured by only considering the first 5 nm of depth of the Au nanoparticle. Therefore, the fundamental length scales defining each component of the potential imply that all can be predominantly relegated to the surface of the particle, allowing for the overlap area, A, to become the focus of the calculations. Finally, because the particles used in this work have been purified in such a way as to prevent rounding of their tips and edges, the majority of the tetrahedron surface area consists of flat {111} facets. Under this model, all interparticle forces are linearly proportional to A, which is appealing because it simplifies the task of comparing the energies of different particle configurations to a geometric calculation for the overlap area of neighboring particle faces (FIGS. 12-17, 19 and 20).

We interpret the nearest-neighbor single-particle interaction potential ($U_{tot}$) as being proportional to the thermodynamic free energy of a Td superlattice following a set of simple assumptions that are foundational to the calculation of crystal properties in statistical mechanics. First, when comparing two or more different crystal structures, entropic effects are ignored. This is valid because the entropy of crystallization is dominated by the reduced translational or rotational degrees of freedom when particles transition from a gas or liquid state to a solid; any entropic differences due to the specific crystalline structure (e.g., achiral or chiral hexagonal) are negligible by comparison. Second, the Helmholtz free energy (F):

$$F_{crystal} = U_{crystal} - TS_{crystal} \quad (2)$$

Shows that at constant temperature (T), if the entropy ($S_{crystal}$) is ignored, the overall interaction energy of the crystal ($U_{crystal}$) is proportional to free energy ($F_{crystal}$).

Finally, if the individual elements in the crystal (atoms or nanoparticles) experience interactions that are short-ranged relative to their size, the nearest-neighbor environment is all that is needed to capture the energy of the lattice (i.e., next nearest neighboring interactions can be ignored). As discussed above, the length scale of Td particle interactions extend at most to ~10% of the particle size and can therefore be considered to be sufficiently short-ranged. The consequence of this line of reasoning is that comparing the relative ($U_{tot}^*$) value for single Td particles in different superlattice configurations is equivalent to comparing the relative thermodynamic free energy of their crystals.

van der Waals interactions are given by 50:

$$U_{vdW}^{Face-Face} = \frac{-AH}{12\pi d^2} \quad (3)$$

where d is the separation between flat particle facets, A is the particle-particle overlap area, and H is the Hamaker constant, taken to be $40 \times 10^{-20}$ J for a Au-water-Au geometry according to ref. (51).

Electrostatic interactions are given by the solution of the linearized Poisson-Boltzmann equation, assuming no charge regulation[52]

$$U_{el}^{Face-Face} = \varepsilon\varepsilon_0 \kappa \varphi^2 A \left[ 1 - \tanh\left( k \frac{d - 2t_{CTAC}}{2} \right) \right] \quad (4)$$

where ε is the relative permittivity of the solvent (water) and $\varepsilon_0$ the permittivity of free space, φ is the constant potential at the CTAC-modified nanoparticle surface taken to be 0.035 V according to ref. (53), ($t_{CTAC}$ the thickness of the CTAC bilayer taken to be 3.2 nm, and K the inverse Debye length which for a monovalent electrolyte is given by[50]:

$$\kappa = \left( \frac{ce^2}{\varepsilon\varepsilon_0 k_B T} \right)^{1/2} \quad (5)$$

where c is the salt concentration, e the elementary charge, $k_B$ Boltmann's constant, and T temperature. To calculate the ionic strength c, we consider CTAC to contribute with unity up to the critical micelle concentration (CMC=1.31 mM for CTAC)[55], after which the fractional charge of micelles (α=0.28 for CTAC)[56] is used to account for incomplete micelle counterion dissociation, which is approximately concentration independent[56].

Depletion interactions are given by[38].

$$U_{dep}^{Face-Face} = -\Delta\Pi A(2t_{CTAC,eff} + D_{CTAC,eff} - d) \quad (6)$$

where $t_{CTAC,eff}$ and $D_{CTAC,eff}$ represent an effective size for the CTAC bilayer thickness and micellediameter, respectively, which is larger than their physical size because they are electrostatically charged. This is accounted for by adding a factor d multiplied by the Debye length $\kappa^{-1}$ according to ref. (39):

$$t_{CTAC,eff} = t_{CTAC} + \delta \kappa^{-1} \quad (7)$$

$$D_{CTAC,eff} = D_{CTAC} + 2\delta \kappa^{-1} \quad (8)$$

where we take $\delta = 0.725$, determined for a similar system of quaternary ammonium halide coated gold nanoparticles assembled via charged quaternary ammonium surfactant depletants according to ref. (57). $D_{CTAC}$ is calculated according to the Israelachvilli molecular packing parameter model:

$$D_{CTAC} = 2\left(\frac{3 N_{agg} V_0}{4\pi}\right)^{1/3} \quad (9)$$

where $V_0$ is the molecular volume equal to 0.4309 nm$^3$ for CTAC according to ref. (58), and Naggis the aggregation number for CTAC micelles. We account for the possibility of DCTAC changing with CTAC concentration by fitting the concentration-dependent Nagg values from ref. (56) to an empirical power-law function with $R^2 = 0.986$.

ΔΠ is the change in osmotic pressure given by the Carnahan-Starling equation of state for a system of concentrated charged micelles by[52,59].

$$\Delta \Pi = n k_B T (1 + \varnothing_{eff} + \varnothing^2_{eff} - \varnothing^3_{eff})(1 - \varnothing_{eff})^{-3} \quad (10)$$

where $n = (N_A/N_{agg})(c-CMC)$, $N_A$ is Avogadro's number and $$\varnothing_{eff} = n \frac{4}{3}\pi \left(\frac{d_{CTAC,eff}}{2}\right)^3. \quad (11)$$

Using the above framework, the evolution of a system of CT AC-coated particles from monomeric entities to assembled superlattices can be predicted by: (1) calculating the total energy per particle, $U_{tot}$, as a function of interparticle separation, d, (2) finding the minimum (equilibrium) value of the potential, $U_{tot}$, and corresponding equilibrium spacing d*, and (3) iterating this process as the concentration of depletants (CTAC micelles) and electrolytes (CTA+ and el− ions) increases as a result of solvent evaporation. Since increasing depletants makes particles more attractive and increasing electrolytes make particles less repulsive, the magnitude of the interaction gradually increases (i.e., more negative $U_{tot}$*) and the equilibrium spacing (d*) gradually decreases as the sample droplet shrinks over time. Comparing several such calculations for tetrahedra assembled into different geometric configurations (with corresponding overlap areas, A) allows for determination of the lowest energy superlattice. We consider the assembly process complete when a CTAC concentration of ~2.0 M is reached, as this is approximately the solubility limit for CT AC in water and the point at which the sample has less than 1% of the initial volume. This results in a system with interaction potentials that are so strongly attractive (1000's of k8T) that all particles are irreversibly attractive and the possibility for rearrangement is minimal.

The interaction between the substrate and the tetrahedra is treated separately from particle-particle interactions but modeled using same framework as above. For vdW interactions, a Hamaker constant for a Au-water-Si geometry was approximated to be 10×10-20 J using the combining relationships and data from several references 61,69,70. For electrostatic interactions, a similar linearized Poisson-Boltzmann equation was used but for two dissimilar surfaces:

$$U_{el}^{Face-Sub} = \varepsilon \varepsilon_0 \kappa \varphi_{Au} \varphi_{Si} A \left[1 - \tanh\left(\kappa \frac{d - 2t_{CTAC}}{2}\right)\right] \quad (12)$$

where $\varphi_{Au}$ is the constant potential at the CTAC-modified gold surface (defined above) and $\varphi_{Si}$; is the constant potential at the CTAC-modified silicon substrate, taken to be 0.004 V according to ref. 70. Depletion forces are assumed to remain unchanged for NP-substrate interactions for which the Si surface has a roughness less than the depletant micelle size of ~5 nm; this is the case for all experimental results unless otherwise noted. When roughness exceeds the depletant size, depletion forces are weakened because asperities prevent the closest approach of surfaces and thereby reduce the excluded volume that drives the attraction. We develop a qualitative understanding of the importance of this effect by assuming that depletion forces are reduced to 1/10 their original magnitude in the presence of roughened silicon substrates, which is consistent with literature results.

Because the 2D superlattices reported in this work are observed to form on a range of different flat and homogeneous substrate materials (e.g., Si, Si3N4, carbon, mica), regardless of whether they are plasma cleaned or not, we conclude that wetting and/or contact angle pinning effects are not important contributors to the assembly mechanism.

Characterization: Transmission electron microscopy (TEM) was performed with a JOEL 2100Fat a voltage of 200 kV in TEM mode. The high angle angular dark field-scanning transmission electron microscope (HAADF-STEM) images were collected by the FEI Titan Themis$^3$ S/TEM operated at an accelerating voltage of 300 kV with a double tilt holder. Scanning electron microscope (SEM) images were collected with a FEI Helios NanoLab 660 Dual Beam with working voltage of 5 kV, working current of 25 pA, and working distance of 4 mm.

Image analysis and structure assignment. Shape purity analysis of Au Td NPs was performed using Adobe Photoshop by marking tetrahedron-shaped NPs with red dots and impurities with blue dots and exporting their count values. Edge lengths were measured by the Gatan microscopy suite (GMS 3.0) software with the original. dm3 files. The radius of curvature of truncated Td NPs was analyzed with Adobe Illustrator using the rounded triangular shape tool which, when calibrated to the image scale bar, allowed for calculation of a quantitative value. All 3D models of Td superlattices were constructed and rendered with Cinema 4D.

Assembly of Au Td@Ag cube NPs for purification: Self-assembly has been widely used to purify NPs with large surface area since they can form extended assemblies and precipitate (e.g., cubes, prisms, high aspect ratio nanorods, etc.). Since the target Au Td NPs could be selectively embedded in Ag cubes via overgrowth, we hypothesized they could be purified by considering the assembly of cube-shaped particles. To determine the purification conditions, especially the concentration of surfactant, we used the following empirical formula for interparticle attraction that has been used in previous reports to predict selective assembly and precipitation:

$$\frac{|U|}{k_B T} = \frac{2 r_m A N_{0(c-cmc)}}{n} \quad \text{Eq. S1}$$

where $k_B T$ is the thermal energy, $r_m$ the micelle radius, A the particle-particle facet contact area, $N_0$ Avogadro's number, c the concentration of surfactant, cmc the critical micelle concentration, and n the number of molecules that assemble to form a micelle. For CTAC solutions, the $r_m$, cmc and n are 3 nm, 1 mM and 120, respectively. For a typical Au Td@Ag cube NP, the cube edge length is 70 nm, leading to a possible contact area, A, of 4900 nm². According to previous reports, when the empirical potential

|U| reaches 4~5 $k_BT$, the targeted NPs will assemble and precipitate, suggesting that a CTAC concentration around 28-35 mM will result in Au Td@Ag cube NP assembly. It is important to mention that due to the batch-to-batch differences, it is necessary to measure the size of Au Td@Ag cube NPs before purification and adjust conditions accordingly; most of our samples required 32 mM CTAC to purify Au Td@Ag cube NPs with 70 nm edge length. Multiple rounds of precipitation and separation with this method lead to increasingly pure samples.

3D structure analysis and calculations: To have a complete understanding of the formation of the chiral hexagonal (3) phase, we considered a series of related 2D structures with different packing of Td particles. Due to the nature of the interactions between particles in our system, assemblies that have the highest face-to-face contact area and smallest interparticle distance will be those of minimum energy, i.e., most favorable. Since we are only considering structures capable of forming extended 2D crystals, we exclude from our analysis Td assemblies that result in local decahedral or icosahedral packing and lack long-range order.

For achiral (1) assemblies: we consider a structure where a tetrahedron dimer with hexagon-shaped face-to-face contact area is arrayed in a 2D hexagonal Bravais lattice. The extended material resembles two interpenetrated sheets of Td, each with in-plane triangular tip-to-tip packing. This results in a hexagonal contact area and interparticle distance, d.

For tetrahedra with edge length (L), the overlap area (S) is given by a hexagon with edge length of L/3:

$$S = \frac{\sqrt{3}}{6}L^2 \qquad \text{Eq. S2}$$

The minimum interparticle distance ($d_{min}$) can be obtained with the model in using the equations of two planes. We consider a cube with edge length α, the diagonal of which produces a Td with edge length L. Two typical planes can be calculated by two sets of points:

(a, a, 0); (a, 0, a); (0, a, a)    Plane I $\left(\frac{a}{2}, \frac{a}{2}, \frac{3a}{2}\right); \left(\frac{3a}{2}, \frac{a}{2}, \frac{a}{2}\right); \left(\frac{a}{2}, \frac{3a}{2}, \frac{a}{2}\right)$    Plane II The corresponding equations for above planes are:

$x + y + z = 2a$    Plane I $x + y + z = \frac{5a}{2}$    Plane II

The distance (d) between two parallel planes is:

$$d = \frac{\left|\frac{5a}{2} - 2a\right|}{\sqrt{1^2 + 1^2 + 1^2}} = \frac{a}{2\sqrt{3}} = \frac{\sqrt{3}a}{6} \qquad \text{Eq. S3}$$

Since the edge length (L) of tetrahedra is:

$$L = \sqrt{2}a \qquad \text{Eq. S4}$$

and since this is the closest-packed Td can get in the achiral (1) phase given their tip sharpness, the minimum distance ($d_{min}$) between two tetrahedra NPs is:

$$d_{min} = d = \frac{\sqrt{3}}{6}a = \frac{\sqrt{3}}{6}\frac{\sqrt{2}}{2}L = \frac{\sqrt{6}}{12}L \qquad \text{Eq. S5}$$

For the tetrahedra in this work, L=66.3 nm, so the corresponding S and $d_{min}$ are:

$S$=1268.926 nm²

$d_{min}$=13.533 nm

Schematic illustration and 3D models of the achiral (1) structure. A) Extended lattice of achiral (1) assemblies; B) Model coordinate system used to calculate the contact area and interparticle distances; C) Projection of two tetrahedra NPs along their [111] axis and D) Overlap area S of two Td {111} planes; E) Interparticle distance between two tetrahedra NPs.

For achiral (2) assemblies: we considered a structure identical to achiral (1) in which the top layer of Td (tips pointing down) are shifted along a unit vector such that each particle has one nearest neighbor (NN) with face-to-face spacing smaller than the $d_{min}$ calculated above but two next-nearest neighbors (NNN) with spacing larger than $d_{min}$. Since the achiral (1) structure is unfavorable because of the geometric constraint imposed by the sharp tips that sets a large value for $d_{min}$, we hypothesized that this translation of the top layer of particles might result in a lower energy configuration. This structure maintains the tip-to-tip packing of achiral (1) with a hexagon-shaped NN contact area and a smaller elongated hexagonal parallelogram-shaped NNN contact area.

After shifting a layer of tetrahedra to a new NN particle distance of d* (red arrow) a parameter ϕd can be defined as:

$$\Delta d = d - d^* = \frac{\sqrt{6}}{12}L - d^* \qquad \text{Eq. S6}$$

This changed distance can be treated as the projection of movement of tetrahedra along the normal direction of their surface. Based on the structure geometry, this movement (M) is related to the dihedral angle (α), where in our case cos(α)=1/3, and sin(α)=2√2/3:

$$M = \frac{\Delta d}{\sin\alpha} = \frac{\Delta d}{2\sqrt{2}/3} = \frac{3\sqrt{2}}{4}\Delta d \qquad \text{Eq. S7}$$

After this movement, the distance (d') between the NNN facets is enlarged, which can be calculated from the top view of the assemblies. The movement (M) is a vector and can be decomposed into vectors describing the movement along the tetrahedron face (M') and the movement perpendicular to the tetrahedron face (M") given by:

$$M' = M\cos 30° = \frac{\sqrt{3}}{2}M = \frac{3\sqrt{6}}{8}\Delta d \qquad \text{Eq. S8}$$

$$M" = M\sin 30° = \frac{1}{2}M = \frac{3\sqrt{2}}{8}\Delta d \qquad \text{Eq. S9}$$

The NNN interparticle distance (d') can be regarded as the original distance between two tetrahedra plus the movement distance:

$$d' = d + \frac{2\sqrt{2}}{3}M" =$$

$$d + \frac{1}{2}\Delta d = \frac{\sqrt{6}}{12}L + \frac{1}{2}\left(\frac{\sqrt{6}}{12}L - d^*\right) = \frac{\sqrt{6}}{8}L - \frac{1}{2}d^* \qquad \text{Eq. S10}$$

The NN contact area maintains the same value (S) as achiral (1). However, the contact area of NNN faces (S') is reduced. The movement (M') along the tetrahedron face, can be used to calculate the new overlap area:

$$S' = \left(\frac{2L}{3} - \frac{3\sqrt{6}}{8}\Delta d\right) \times \frac{2L}{3} \times \frac{\sqrt{3}}{2} - 2 \times \frac{\sqrt{3}}{4}\left(\frac{L}{3} - \frac{3\sqrt{6}}{8}\Delta d\right)^2 = \qquad \text{Eq. S11}$$

$$\frac{229\sqrt{3}}{1536}L^2 + \frac{27\sqrt{2}}{128}Ld^* - \frac{27\sqrt{3}}{64}d^{*2}$$

For the achiral (2) assemblies, the corresponding S, S' and d' are:

$$S = 1268.926 \text{ nm}^2$$

$$S' = 1135.094 + 19.778d^* - 0.731d^{*2} \text{ nm}^2$$

$$d' = 20.300 - 0.5d^* \text{ nm}$$

For the packing of tetrahedra with rounded tips: Chemically etching tetrahedra results in selective rounding of their tips, which results in a decreased minimum interparticle distance while maintaining a large contacting area. We define the tip radius of curvature (R) and calculate the resulting minimum the interparticle distance ($d_{min}^R$) using (H), the projection of the particle-particle movement. Based on the geometrical model (D), H can be calculated from:

$$H = O'B - O'A = R - O'A \qquad \text{Eq. S20}$$

$$O'A = \frac{O'D}{\cos 30°} = \frac{O'E - CD}{\cos 30°} = \qquad \text{Eq. S21}$$

$$\frac{O'E - AC}{\cos 30°} = \frac{O'E - A\sin 60°}{\cos 30°} = \frac{R - \sqrt{3}R/2}{\sqrt{3}/2} = \frac{2\sqrt{3} - 3}{3}R$$

H can be obtained:

$$H = R - O'A = R - \frac{2\sqrt{3} - 3}{3}R = \frac{6 - 2\sqrt{3}}{3}R \qquad \text{Eq. S22}$$

The minimum interparticle distance as a function of tip rounding ($d_{min}^R$) is:

$$d_{min}^R = d_R = \qquad \text{Eq. S23}$$

$$d - \frac{2\sqrt{2}}{3}H = \frac{\sqrt{6}}{12}L - \frac{2\sqrt{2}}{3}\frac{6 - 2\sqrt{3}}{3}R = \frac{\sqrt{6}}{12}L - \frac{12\sqrt{2} - 4\sqrt{6}}{9}R$$

The contact area (S) is independent of tip radius and identical to that for achiral (1). For our Td particles with 66.3 nm edge length, the simplified expressions are:

$$S = 1268.926 \text{ nm}^2$$

$$d_{min}^R = 13.533 - 0.797R \text{ nm}$$

These equations were used to calculate the energetic stability of different achiral (1) structures as a function of tip radius, allowing for the mapping of the chiral (3) to achiral (1) phase transition (FIG. 10E).

For the transition from achiral (1) to chiral (3) via rotation-based phase change; As shown in FIGS. 15A-15D, we considered the possibility for a structure in the achiral (1) phase with sharp tips and large $d_{min}$ to lower the energy of the system by rotating tetrahedra about their central [111] axis by an angle, θ. By avoiding tip-to-tip contact, this structure can have a lower $d_{min}$ and more favorable interactions at the expense of lower face-to-face contact area and less favorable interactions. Both clockwise rotation (0<θ<30°) and counterclockwise rotation (0<θ<−30°) result in degenerate energies, explaining the racemic mixture of planar chiral superlattice enantiomers. After rotation by an angle (θ), the minimum interparticle distance between two tetrahedra is denoted $d_{min}^θ$ and the contact area is denoted S".

We define $R_0$ and $R_1$ as the radius of circumscribed circles in the middle of an equilateral triangular Td face before and after rotation, respectively. The corresponding relationship between the offset distance (D) and rotation angle (θ) can be obtained by the enlarged triangle in blue, which is:

$$h = L\sin\theta \qquad \text{Eq. S12}$$

$$D = \frac{h}{\sin(\theta + 60°)} \qquad \text{Eq. S13}$$

$$D = \frac{L\sin\theta}{\sin(\theta + 60°)} \qquad \text{Eq. S14}$$

The offset distance (D) and the edge length of tetrahedra (L) can be measured from SEM images of chiral (3) assemblies (FIG. 4d), allowing for calculation of the experimental rotation degree (θ) from eq. S14 as:

$$\theta = \arctan\left(\frac{\sqrt{3}D}{2L - D}\right) \qquad \text{Eq. S15}$$

Then, based on the enlarged triangle in green, the relationship between $R_0$, $R_1$, D' and D" can be obtained:

$$R_0 = \frac{\sqrt{3}L}{3} \qquad \text{Eq. S16}$$

$$R_1 = \frac{\sqrt{3}}{3}(L - D)$$

-continued $$R_0 - R_1 = \frac{\sqrt{3}}{3}D = \frac{\sqrt{3}\,L\sin\theta}{3\sin(\theta + 60°)}$$

$$D' = (R_0 - R_1)\sin(30°) = \frac{R_0 - R_1}{2} = \frac{\sqrt{3}\,L\sin\theta}{6\sin(\theta + 60°)}$$

$$D'' = (R_0 - R_1)\cos(30°) = \frac{\sqrt{3}\,(R_0 - R_1)}{2} = \frac{L\sin\theta}{2\sin(\theta + 60°)} \quad \text{Eq. S17}$$

Similar to the movement in the achiral (2) case, the offset distance (D) can be used to calculate the minimum particle distance from the movement perpendicular to the tetrahedron face (D'):

$$d_{min}^\theta = d'' = d - \frac{2\sqrt{2}}{3}D' = \frac{\sqrt{6}}{12}L - \frac{\sqrt{6}\,L\sin\theta}{9\sin(\theta + 60°)} \quad \text{Eq. S18}$$

The decreased contact area (S″) can be calculated:

$$S'' = \frac{\sqrt{3}}{6}L^2 - \frac{\sqrt{3}}{8}L^2\frac{\sin^2\theta}{\sin^2(\theta + 60°)} \quad \text{Eq. S19}$$

For the chiral (3) assemblies in this work, the offset distance (D) is 24.9 nm. Based on eq. S15, S18 and S19, the corresponding parameters are:

$\theta = 21.82585°$ $d_{min} = d'' = 6.892$ nm $S'' = 1134.634$ nm$^2$

Plasmonic materials that support chiral optical modes have been proposed as the most feasible route to metamaterials with a negative refractive index. Applications of such a material would include: lenses that break the diffraction limit, 3D display technologies, and optical cloaking/camouflage. Plasmonic structures have also been shown to catalyze certain chemical reactions via "hot" electrons. If reactions of a specific enantiomer can be selectively catalyzed by a chiral plasmonic material, this would impact the field of organic synthesis and medicinal chemistry, as specific enantiomer are often desired but difficult to generate in excess yield relative to their opposite enantiomeric counterparts. To the best of our knowledge, there are no examples of 2D planar chiral structures that have been generated through self-assembly. These have been exclusively made through lithography. 1D structure that are chiral have been assembled before, but these have more limited utility in the context of optical metamaterials, where a 2D structure is ideal. Generating the precursor tetrahedron-shaped gold nanoparticles in sufficient yield and purity is laborious. However, this process could be automated in the future. In addition, the assembly of tetrahedra into the chiral 2D superlattice takes 10-12 hours and may require even more time for the formation of a macroscopic flake. However, using elevated concentrations of particles and higher temperatures may significantly reduce this time.

When inorganic materials are synthesized in the form of nanoscale particles, surface phenomena play an outsized role in determining the overall behavior of the system. Boles, M. A.; Ling, D.; Hyeon, T.; Talapin, D. V. The surface science of nanocrystals. *Nat. Mater.* 2016, 15, 141. For most nanoparticle (NP) systems, surfaces are decorated with organic ligands that guide particle growth, provide colloidal stability, and influence properties. Currently, the roles that ligands play in these processes are revealed by trial-and-error experimentation rather than mechanistic understanding. The overarching research goal of my lab is to shed light on the black box of ligand chemistry in inorganic nanoscale systems, ultimately allowing for the rational design of novel nanomaterials:

(1) Single-particle methods have been developed to image the ligand-directed growth of NPs in liquids over time by leveraging transmission electron microscopy (TEM) tools that trap samples in sealed chambers. Rehn, S. M.; Jones, M. R. New Strategies for Probing Energy Systems with In Situ Liquid-Phase Transmission Electron Microscopy, *ACS Energy Lett.* 2018, 3, 1269; Ross, F. M. Opportunities and challenges in liquid cell electron microscopy. *Science* 2015, 350. This allowed for the first observation of an Oh to Td symmetry breaking process and an understanding of the ligand-based kinetic mechanism. Sun, M.; Cheng, Z.; Chen, W.; Jones, M. Understanding Symmetry Breaking at the Single-Particle Level via the Growth of Tetrahedron-Shaped Nanocrystals from Higher-Symmetry Precursors. *ACS Nano* 2021, 15, 15953.

(2) A platform has been created for reproducibly deforming inorganic NPs and discovered a phenomenon in which ligand surface chemistry dictates the particle's mechanical properties. Rehn, S. M.; Gerrard-Anderson, T. M.; Qiao, L.; Zhu, Q.; Wehmeyer, G.; Jones, M. R. Mechanical Reshaping of Inorganic Nanostructures with Weak Nanoscale Forces. *Nano Lett.* 2021, 21, 130. This arises from a ligand-mediated rigidification and disordering of the nanocrystal's surface atoms, ultimately allowing for chemo-mechanical actuation of inorganic nanostructures.

(3) It has been discovered that the "seed" precursors that have been used to initiate gold NP growth for the last two decades have been misidentified as 2-4 nm particles. Instead, we show that they are atomically-precise inorganic clusters consisting of a 32 atom Au core with 8 halide ligands and 12 neutral bound ion pair ligands. This finding opens new avenues for understanding synthesis from a molecular perspective with improved control over particle morphology and properties.

(4) As previously discussed, the present inventors have shown that tetrahedron-shaped (Td) NPs will self-assemble into two-dimensional chiral superlattices given the correct balance of surface-ligand-driven attractive and repulsive forces. The assembly mechanism involves a novel rotational phase transition and kinetically-enhanced 2D growth. Controlling the formation of these materials is exciting because of their unique chiral optical properties and mesoporous structure.

Using Molecules to Build Materials

The use of porous inorganic materials (e.g., zeolites) as molecular sieves and heterogeneous catalyst supports has enabled numerous chemical processes relevant to green energy and water purification. Jacobs, P. A.; Flanigen, E. M.; Jansen, J. C.; van Bekkum, H. *Introduction to Zeolite Science and Practice*; Elsevier Science: 2001. Separately, inverse opal photonic crystal materials rely on a similar periodic array of pores within an oxide matrix and are also relevant to energy storage. Armstrong, E.; O'Dwyer, C. Artificial opal photonic crystals and inverse opal structures—fundamentals and applications from optics to energy storage. *J. Mater. Chem. C.* 2015, 3, 6109. In both cases, instantiating chirality into these structures while controlling pore size would be beneficial, e.g., for asymmetric catalysis or chiroptical wave guides. However, achieving this kind of structure control remains a challenge that heretofore has been addressed only through brute force experimental methods or non-scalable synthetic routes. Thiel, M.; Fischer, H.; von Freymann, G.; Wegener, M. Three-dimensional chiral photonic superlattices. *Opt. Lett.* 2010, 35, 166; Brand, S. K.; Schmidt, J. E.; Deem, M. W.; Daeyaert, F.; Ma, Y.; Terasaki, O.; Orazov. M.; Davis, M. E. Enantiomerically enriched, polycrystalline molecular sieves. *Proc. Natl. Acad. Sci. U.S.A.* 2017, 114, 5101. Novel oxide materials with chiral pores and channels can be created using inorganic nanoparticle superlattices as templates. The surface chemistry of gold Td NPs can be used to control their "hydrodynamic shape" by dictating the length scale of their interaction with other particles. For example, Td functionalized with ligands that create a large interaction length scale relative to their size result in particles that more closely resemble a truncated tetrahedron with respect to their assembly behavior (FIGS. 15A and 15B). Systematically changing the hydrodynamic shape of Td particles has allowed fabrication of a library of NP superlattices (e.g., quasicrystalline, diamond, clathrate, orthorhombic) many of which have been predicted by simulation, but few, if any, have heretofore been observed experimentally. See, Damasceno, P. F.; Engel, M.; Glotzer, S. C. Crystalline Assemblies and Densest Packings of a Family of Truncated Tetrahedra and the Role of Directional Entropic Forces. *ACS Nano* 2012, 6, 609; Haji-Akbari, A.; Engel, M.; Keys, A. S.; Zheng, X.; Petschek, R. G.; Palffy-Muhoray, P.; Glotzer, S. C. Disordered, quasicrystalline and crystalline phases of densely packed tetrahedra. *Nature* 2009, 462, 773. Liquid phase transmission electron microscopy (TEM) measurements can be used to directly observe the assembly of these structures to develop mechanistic understanding of their formation. Interestingly, many of these phases contain chiral arrangements of Td NPs, the super crystals of which are large enough such that a single enantiomer can be isolated. Dried superlattice samples can be used as templates for atomic layer deposition (ALD) or solgel processes to grow oxide materials from the gold particle surfaces. Selective dissolution of the NPs will result in an "inverse" lattice consisting of a rigid oxide framework with chiral pores and channels defined by the original particle dimensions. Inverse lattices of this sort will intrinsically possess photonic band gaps and subsequent decoration with small catalytic particles or hydrophobic functional groups will facilitate their use in asymmetric catalysis or chiral separations, respectively.

The foregoing description of the preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments as are suited to the particular use contemplated. It is intended that the scope of the invention be defined by the claims appended hereto and their equivalents. The entirety of each of the aforementioned documents is incorporated by reference herein.

What is claimed is:

1. A composition of matter comprising purified achiral gold tetrahedron-shaped nanoparticles assembled into two-dimensional superlattices that exhibit planar chirality under a balance of repulsive electrostatic and attractive van der Waals and depletion forces.

2. A method for forming a composition of matter comprising purified achiral gold tetrahedron-shaped nanoparticles assembled into two-dimensional superlattices that exhibit planar chirality under a balance of repulsive electrostatic and attractive van der Waals and depletion forces, the method comprising the steps:
    synthesizing gold (Au) seeds;
    synthesizing gold tetrahedra (Au Td) nanoparticles from said synthesized gold (Au) seeds;
    overgrowing the synthesized gold tetrahedra (Au Td) nanoparticles with silver (Ag) cubes;
    purifying the gold tetrahedra nanoparticles in the silver cubes (Au Td@Ag);
    removing the Ag cube on purified Au Td@Ag cube nanoparticles through selective etching; and
    assembling the gold tetrahedra (Au Td) nanoparticles on a support member to form a two-dimensional superlattices.

3. The method according to claim 2, wherein the support member comprises a silicon wafer.

4. The method according to claim 2, further comprising the step of rounding the tips of the gold tetrahedra nanoparticles prior to assembling the gold tetrahedra nanoparticles on the support member.

5. The method according to claim 4, wherein the step of rounding the tips of the gold tetrahedra nanoparticles comprises chemically truncating the tips of tetrahedra nanoparticles through a selective oxidation reaction.

6. The method according to claim 2, further comprising the step of lowering the energy of the composition of matter by rotating tetrahedra about their central axis to avoid tip-to-tip contact.

7. The method according to claim 2, wherein the synthesized gold seeds are atomically-precise inorganic clusters consisting of a 32 atom Au core with 8 halide ligands and 12 neutral bound ion pair ligands.

8. The method according to claim 2, wherein said step of assembling the gold tetrahedra nanoparticles on the support member comprises rotational phase transition to produce achiral gold tetrahedron-shaped nanoparticles and kinetically-enhanced 2D growth of superlattices.

* * * * *